United States Patent
Morrison et al.

(10) Patent No.: US 11,733,784 B2
(45) Date of Patent: *Aug. 22, 2023

(54) COMBINED FINGERPRINT READER/POWER BUTTON SYSTEM

(71) Applicant: Dell Products L.P., Round Rock, TX (US)

(72) Inventors: Jason Scott Morrison, Chadron, NE (US); Brandon Joel Brocklesby, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,052

(22) Filed: Mar. 14, 2022

(65) Prior Publication Data

US 2022/0197400 A1    Jun. 23, 2022

Related U.S. Application Data

(63) Continuation of application No. 16/862,021, filed on Apr. 29, 2020, now Pat. No. 11,314,336.

(51) Int. Cl.
| | |
|---|---|
| *G09G 5/00* | (2006.01) |
| *G06F 3/02* | (2006.01) |
| *G06F 1/16* | (2006.01) |
| *H01H 13/705* | (2006.01) |
| *G06V 40/12* | (2022.01) |

(52) U.S. Cl.
CPC ............ *G06F 3/021* (2013.01); *G06F 1/1671* (2013.01); *G06V 40/1365* (2022.01); *H01H 13/705* (2013.01); *G06F 1/1616* (2013.01); *H01H 2231/002* (2013.01)

(58) Field of Classification Search
CPC ...... G06F 3/021; G06F 1/1671; G06F 1/1616; G06F 1/1684; G06F 21/32; G06V 40/1365; G06V 40/13; H01H 13/705; H01H 2231/002; H01H 2003/0293; H01H 2235/006; H01H 2235/018
USPC ................................ 345/156, 173, 174, 166
See application file for complete search history.

(56) References Cited

U.S. PATENT DOCUMENTS

| | | | |
|---|---|---|---|
| 2006/0021614 A1* | 2/2006 | Wermeling | A61M 11/06 128/200.14 |
| 2017/0286660 A1* | 10/2017 | Li | G06F 21/32 |
| 2018/0275720 A1* | 9/2018 | Boilard | G06F 1/1616 |

(Continued)

*Primary Examiner* — Thuy N Pardo
(74) *Attorney, Agent, or Firm* — Joseph Mencher

(57) ABSTRACT

A fingerprint reader/power button system includes a base member defining base leg apertures extending into the base member. A spring member engages the base member to provide a spring force that is directed away from the base member. Spring legs on the spring member define respective spring leg apertures that are located adjacent respective base leg apertures. A support member engages the spring member and includes support legs that are configured to extend through the spring leg apertures and into the base leg apertures. A power actuator element connected to the support member is configured to engage a power actuator engagement element when an actuation force on the support member overcomes the spring force. A fingerprint reader connected to the support member is configured to read a fingerprint from a finger that engages a fingerprint reader surface on the fingerprint reader.

20 Claims, 20 Drawing Sheets

(56) References Cited

U.S. PATENT DOCUMENTS

| | | | |
|---|---|---|---|
| 2019/0266315 A1* | 8/2019 | Li | H04L 9/3231 |
| 2019/0282131 A1* | 9/2019 | Chang | G16H 50/70 |
| 2019/0283247 A1* | 9/2019 | Chang | A61B 5/1121 |
| 2020/0103972 A1* | 4/2020 | Amin-Shahidi | G06F 3/0346 |
| 2020/0233945 A1* | 7/2020 | Li | G06F 21/32 |
| 2021/0096594 A1* | 4/2021 | Cao | H05K 5/0017 |
| 2021/0256241 A1* | 8/2021 | Baker | G06F 1/32 |
| 2021/0397808 A1* | 12/2021 | Gupta | G06V 40/13 |

* cited by examiner

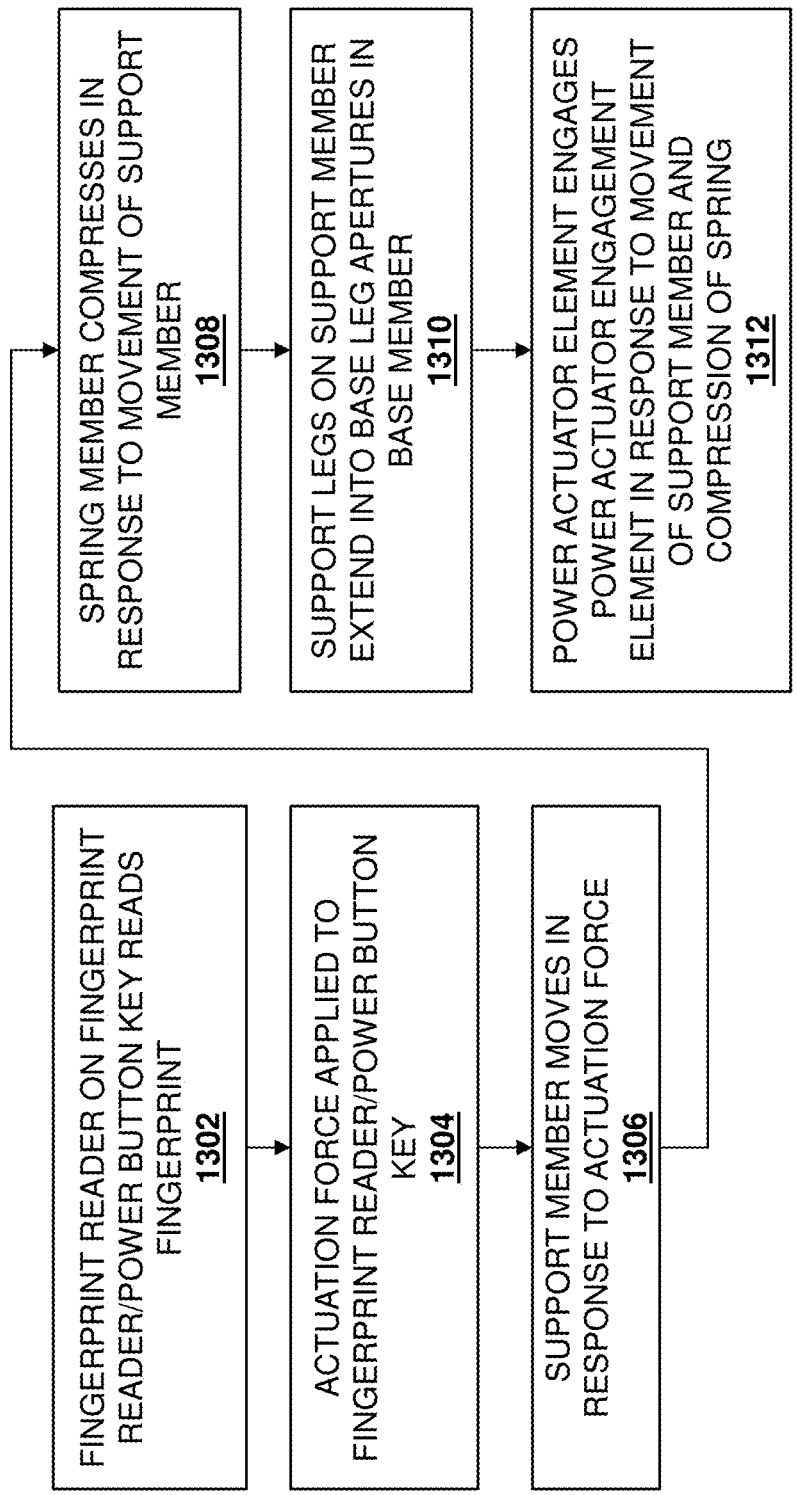

COMBINED FINGERPRINT READER/POWER BUTTON SYSTEM

CROSS-REFERENCE TO RELATED APPLICATIONS

The present disclosure is a continuation of U.S. patent application Ser. No. 16/862,021, filed on Apr. 29, 2020, the disclosure of which is incorporated by reference herein in its entirety.

BACKGROUND

The present disclosure relates generally to information handling systems, and more particularly to a combined fingerprint reader/power button key used with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, laptop/notebook computing devices, have begun to implement fingerprint readers in order to secure the use of those laptop/notebook computing devices. For example, the fingerprint reader on a laptop/notebook computing device may be configured to secure the laptop/notebook computing device by first reading a fingerprint of the user of that laptop/notebook computing device and storing fingerprint information associated with that fingerprint in a database. Subsequent uses of the laptop/notebook computing device will then require provisioning of a fingerprint to its fingerprint reader, and subsequent access and/or use of the laptop/notebook computing device will only be allowed if the provisioned fingerprint matches the fingerprint information in the database.

Many laptop/notebook computing devices are moving the fingerprint reader discussed above to the keyboard area on the laptop/notebook computing devices, which provides Input/Output consolidation and a better user experience. For example, it has become desirable to provide the fingerprint reader as one of the keys on the keyboard for aesthetical reasons, and one embodiment of such keyboard fingerprint readers combines the fingerprint reader with a power button that is included as one of the keys on the keyboard in order to provide a combined fingerprint reader/power button key. However, conventional fingerprint reader/power button systems tend to increase the thickness of the computing systems in which they are utilized, as the requirements of such fingerprint reader/power buttons keys tends to produce a relatively thick structure, which is particularly undesirable in "ultraportable" laptop/notebook computing devices that are designed to be as thin and light as possible.

Accordingly, it would be desirable to provide a fingerprint reader/power button system that addresses the issues discussed above.

SUMMARY

According to one embodiment, an Information Handling System (IHS) includes a chassis; a keyboard that is included on the chassis; a base member that is included in the chassis and that defines a plurality of base leg apertures that extend into the base member from a first surface on the base member; a spring member that engages the base member to provide a spring force that is directed away from the first surface of the base member, wherein the spring member includes a plurality of spring legs that define respective spring leg apertures that are located adjacent respective base leg apertures; a support member that engages the spring member and that includes a plurality of support legs that are configured to extend through the spring leg apertures and into the base leg apertures; a power actuator element that is connected to the support member and that is configured to engage a power actuator engagement element when an actuation force is provided on the support member that overcomes the spring force; and a fingerprint reader that is included in a key that is connected to the support member, wherein the fingerprint reader is configured to read a fingerprint from a finger that engages a fingerprint reader surface on the fingerprint reader that provides an external surface of the key.

BRIEF DESCRIPTION OF THE DRAWINGS

FIG. 13 is a flow chart illustrating an embodiment of a method for providing a fingerprint reader/power button key.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
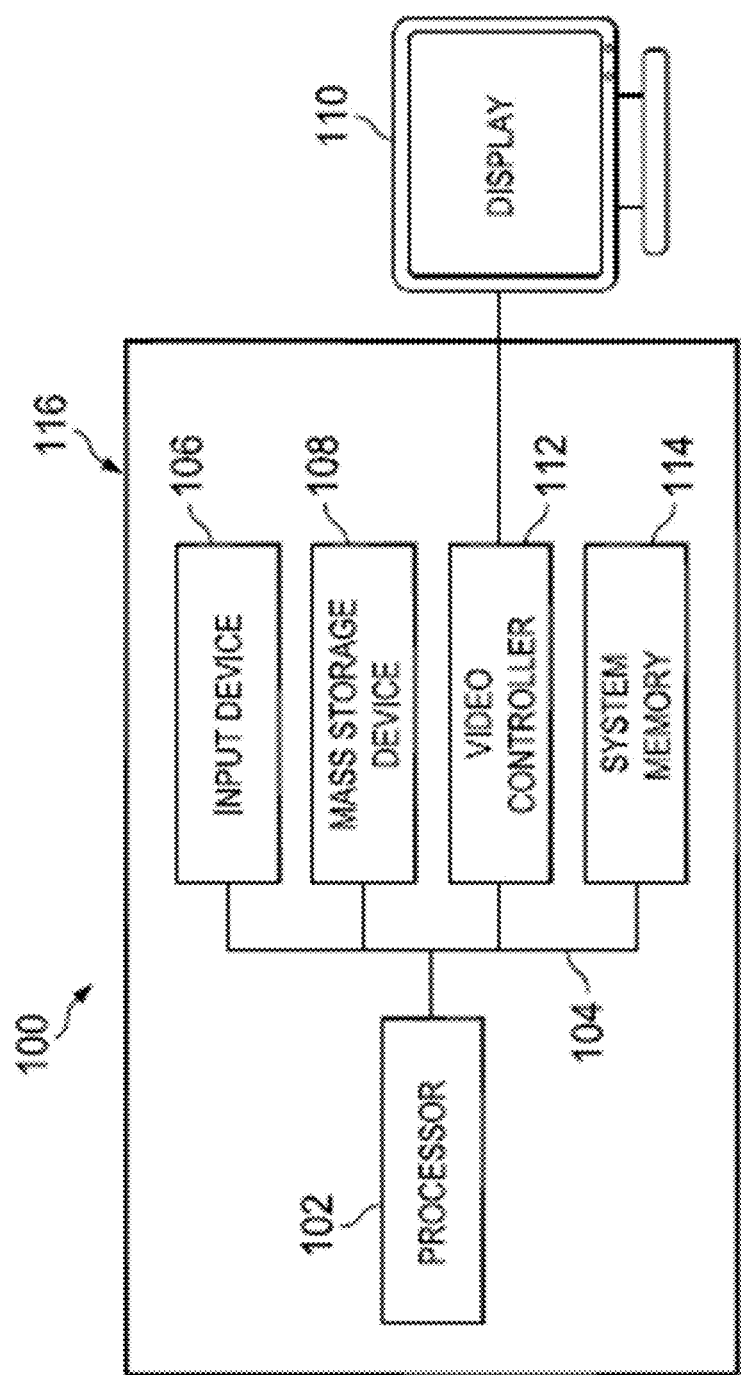
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
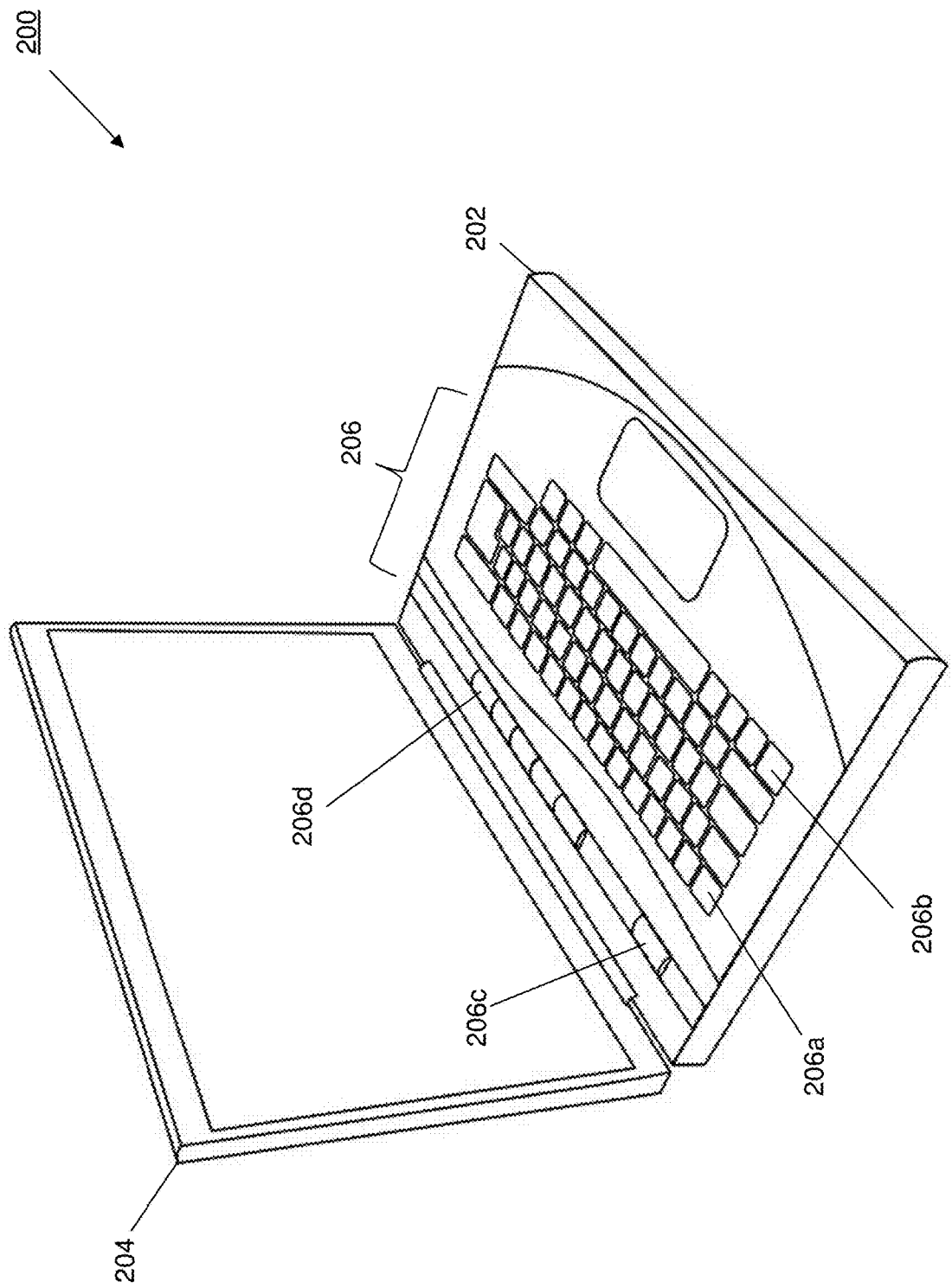
FIG. 2 is a perspective view illustrating an embodiment of a laptop/notebook computing device that may utilize the fingerprint reader/power button system of the present disclosure.

Referring now to FIG. 2, an embodiment of a computing system 200 is illustrated that may utilize the combined fingerprint reader/power button system of the present disclosure. In an embodiment, the computing device 200 may be provided by the IHS 100 discussed above with reference to FIG. 1, and/or may include some or all of the components of the IHS 100, and one of skill in the art in possession of the present disclosure will appreciate that the computing device 200 is illustrated and described below as a laptop/notebook computing device. However, while illustrated and discussed as a laptop/notebook computing device, one of skill in the art in possession of the present disclosure will recognize that computing devices utilizing the combined fingerprint reader/power button system of the present disclosure may include any computing devices or computing device components (e.g., computing device keyboard devices or systems) that may be configured to operate similarly as computing device 200 discussed below. In the illustrated embodiment, the computing system 200 includes a base chassis 202 that is moveably coupled to a display chassis 204, and one of skill in the art in possession of the present disclosure will appreciate how the base chassis 202 and the display chassis 204 may house the components of the computing device 200 (e.g., the components of the IHS 100 discussed above with reference to FIG. 1) that may include processing systems, memory systems, storage systems, communication systems, display systems, input systems, and/or any other computing device systems that would be apparent to one of skill in the art in possession of the present disclosure.

In the illustrated embodiment, the base chassis 202 includes a keyboard area on its surface that includes a keyboard 206 that is accessible to a user of the computing system 200, with the keyboard 206 including a plurality of keys 206a, 206b, 206c, and up to 206d. One of skill in the art in possession of the present disclosure will appreciate that the keys 206a and 206b (and similar keys on the keyboard 206) provide "primary" keys (e.g., the "QWERTY" keys, number keys, punctuation keys, enter/return keys, etc.), while the keys 206c and 206d (and similar keys on the keyboard 206) provide "function" keys. However, while a specific example of keys that are available on a laptop/notebook computing device are illustrated and described herein, one of skill in the art in possession of the present disclosure will recognize that the fingerprint reader/power button system of the present disclosure may provide a combined fingerprint reader/power button key in any of a variety of systems (and with any of variety of keys/buttons/ etc.) while remaining within the scope of the present disclosure as well. For example, the fingerprint reader/power button system of the present disclosure may be provided in a peripheral keyboard device provided with a desktop computing device while remaining within the scope of the present disclosure. As such, while a specific computing device 200 has been illustrated and described, one of skill in the art in possession of the present disclosure will recognize that the fingerprint reader/power button system of the present disclosure may include a variety of components and component configurations while remaining within the scope of the present disclosure as well.

Figure 3:
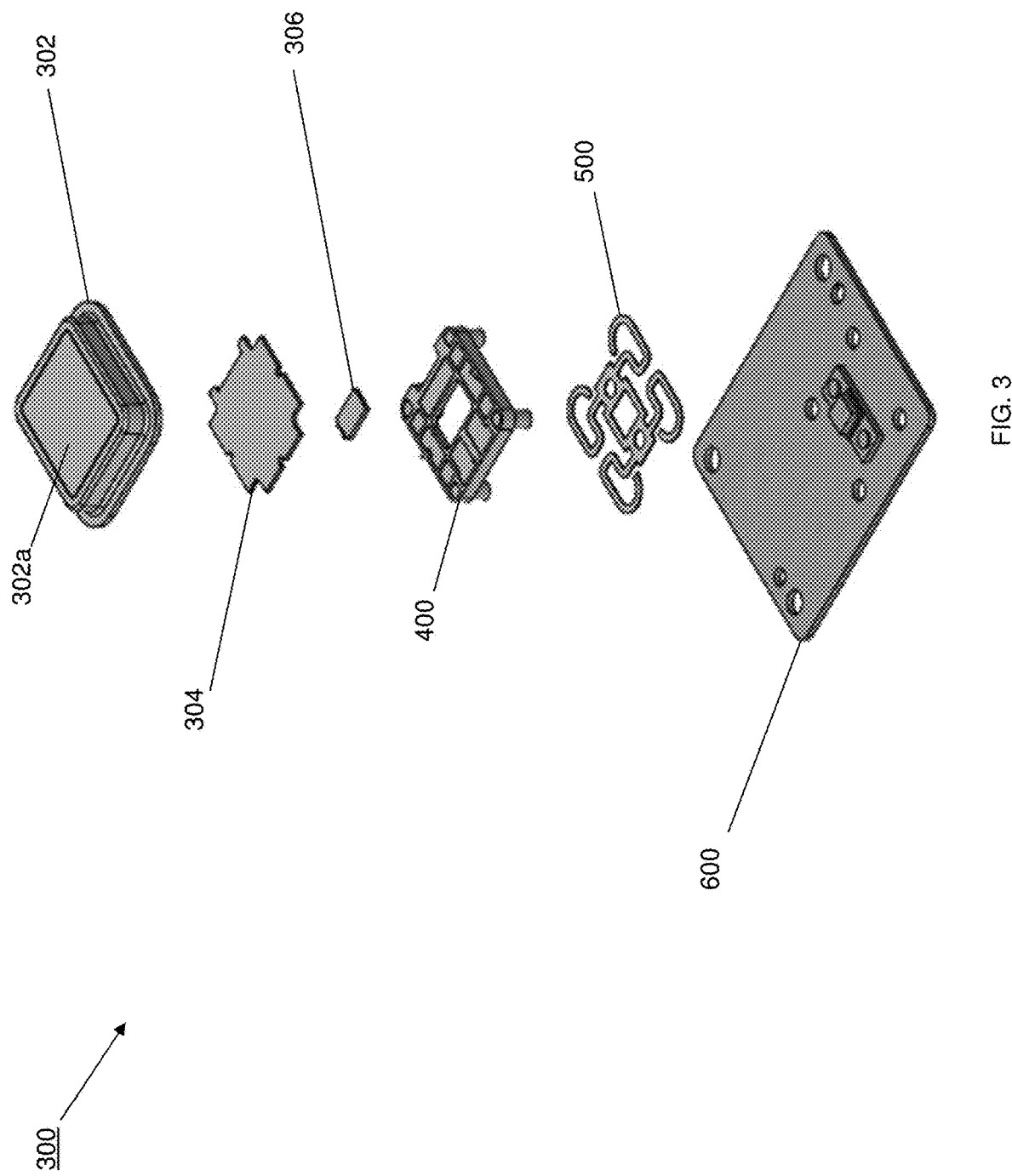
FIG. 3 is an exploded perspective view illustrating an embodiment of a fingerprint reader/power button system that may be provided in the laptop/notebook computing device of FIG. 2.

Referring now to FIG. 3, an exploded view of an embodiment of a fingerprint reader/power button system 300 provided according to the teachings of the present disclosure is illustrated. As discussed above, the fingerprint reader/power button system 300 of the present disclosure may be provided in the computing device 200 discussed above with reference to FIG. 2. As such, the fingerprint reader/power button system 300 may be included on the IHS 100 discussed above with reference to FIG. 1, and/or on a component (e.g., a keyboard device) of the IHS 100. Furthermore, while illustrated and discussed as being provided on a computing device keyboard, one of skill in the art in possession of the present disclosure will recognize that the functionality of the fingerprint reader/power button system 300 discussed below may be provided with other devices that are configured to operate similarly as fingerprint reader/power button system 300 discussed below.

In the illustrated embodiment, the fingerprint reader/ power button system 300 includes a fingerprint reader module 302 that may house at least some of the fingerprint reader components of the fingerprint reader utilized in the fingerprint reader/power button system 300 of the present disclosure, and that provides an external surface 302a of a fingerprint reader/power button key provided by the fingerprint reader/power button system 300 of the present disclosure. As such, the fingerprint reader module 302 may include a glass (or other transparent) element that provides the external surface 302a, and may include (or be coupled to) an optical scanning subsystem, a light sensor subsystem, a Charge Coupled Device (CCD), and/or other fingerprint reader components that would be apparent to one of skill in the art in possession of the present disclosure. In the illustrated embodiment, the fingerprint reader/power button system 300 also includes a fingerprint reader board 304 that may be located adjacent to a bottom surface of the fingerprint reader module 302 (not visible in FIG. 3, but located opposite the external surface 302), and that may be coupled to one or more of the fingerprint reader components in the fingerprint reader module 302, as well as to one or more components in the computing device 200 in which the fingerprint reader/power button system 300 is provided. As will be appreciated by one of skill in the art in possession of the present disclosure, the fingerprint reader board 304 may be provided using a variety of circuit board components known in the art.

In the illustrated embodiment, a power actuator element 306 may be connected to the fingerprint reader board 304 opposite the fingerprint reader board 304 from the fingerprint reader module 302, and as discussed below may be coupled to a support member 400 (discussed in further detail below with reference to FIG. 4) upon which the fingerprint reader board 304 is mounted. As discussed below, power actuator element 306 may be coupled (e.g., via the fingerprint reader board 304, via a separate coupling, etc.) to a power system in the computing device 200 such that its actuation (discussed in further detail below) causes power to be provided from the power system to the computing device 200. A spring member 500 (discussed in further detail below with reference to FIG. 5) is located between the support member 400 and a base member 600 (discussed in further detail below with reference to FIG. 6), with the spring member 500 engaging each of the support member 400 and the base member 600 to provide a spring force that biases the support member 400 away from the base member 600. However while a specific fingerprint reader/power button system 300 has been illustrated, one of skill in the art in possession of the present disclosure will recognize that the fingerprint reader/power button system of the present disclosure may include a variety of components and/or component configurations for providing conventional fingerprint reader/power button system functionality, as well as the functionality discussed below, while remaining within the scope of the present disclosure as well.

Figure 4:
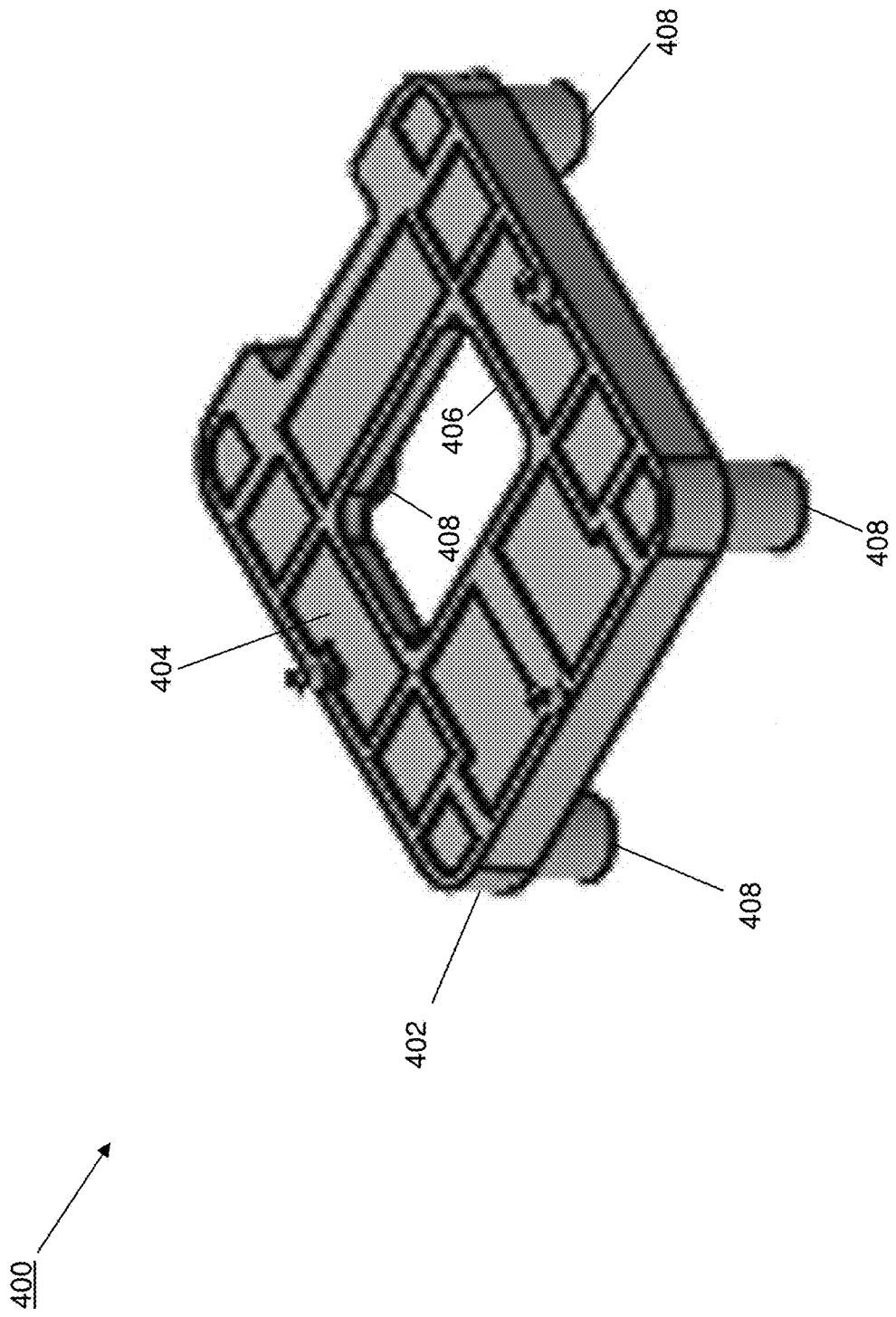
FIG. 4 is a perspective view illustrating an embodiment of a support member included in the fingerprint reader/power button system of FIG. 3.

Referring now to FIG. 4, an embodiment of the support member 400 discussed above with reference to FIG. 3 is described in more detail. In the illustrated embodiment, the support member 400 includes a support base 402 that defines a fingerprint reader board mounting surface 404 that is configured to allow the fingerprint reader board 304 discussed above with reference to FIG. 3 to mount to the support base 402 and, as such, may include any of a variety of board mounting, coupling, and/or securing features that would be apparent to one of skill in the art in possession of the present disclosure. Furthermore, the support base 402 also defines a power actuator element aperture 406 that is configured to allow the power actuator element 306 that is connected to the fingerprint reader board 304 to extend through the support base 402 such that it is accessible via a bottom surface of the support base 402 (not visible in FIG. 4, but opposite the support base 402 from the fingerprint reader board mounting surface 404).

A plurality of support legs 408 extend from the support base 402 and, in the illustrated embodiment, include four support legs 408 that extend from each of the corners of the substantially square-shaped support base 402 illustrated in FIG. 4. While not illustrated, the support base 402 of the support member 400 may also include spring member mounting elements (not visible in FIG. 4) that are located on the bottom surface of the support base 402 (not visible in FIG. 4, but opposite the support base 402 from the fingerprint reader board mounting surface 404) and that are configured to mount the spring member 500 to the support member 400, discussed in further detail below. However, one of skill in the art in possession of the present disclosure will recognize that the spring member 500 may be provided between the support member 400 and the base member 600 in a variety of manners that will fall within the scope of the present disclosure. For example, then spring member 500 may be mounted to the base member 600 while engaging the support member 500. Furthermore, while a specific support member 400 has been illustrated, one of skill in the art in possession of the present disclosure will recognize that the fingerprint reader/power button system of the present disclosure may include a variety of components and/or component configurations for providing the functionality of the support member 400 discussed below while remaining within the scope of the present disclosure as well.

Figure 5:
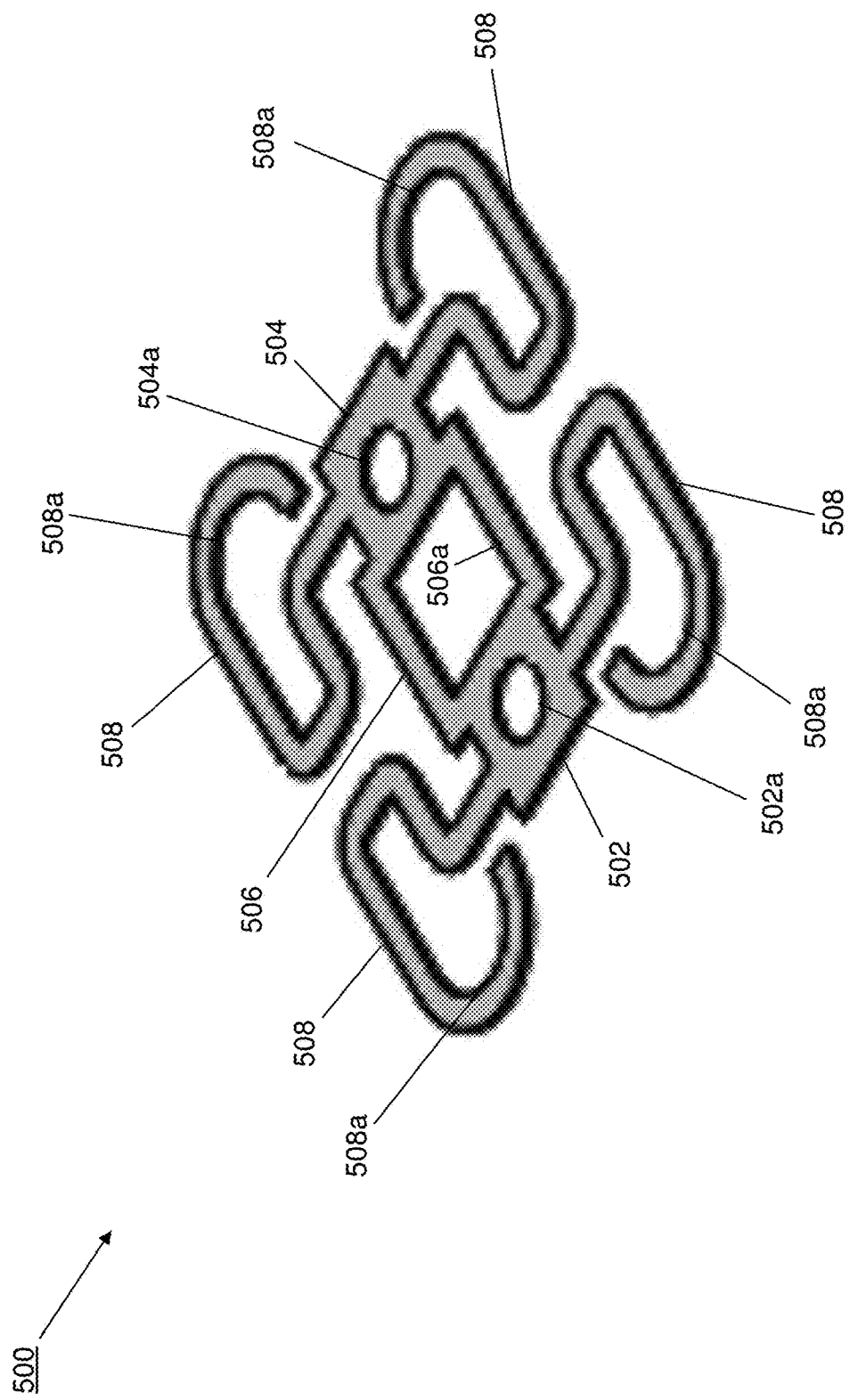
FIG. 5 is a perspective view illustrating an embodiment of a spring member included in the fingerprint reader/power button system of FIG. 3.

Referring now to FIG. 5, an embodiment of the spring member 500 discussed above with reference to FIG. 3 is described in more detail. In some embodiments, the spring member 500 may be provided by a stainless steel material, although other spring materials will fall within the scope of the present disclosure as well. In the illustrated embodiment, the spring member 500 includes a pair of base member mounting portions 502 and 504 connected by a power actuator engagement element coupling portion 506. In the example provided herein, each of the base member mounting portions 502 and 504 define respective mounting apertures 502a and 504a that are configured to mount the spring member 500 to the base member 600 as discussed in further detail below, and the power actuator engagement element coupling portion 506 defines a power actuator engagement member aperture 506a that is configured to allow a power actuator engagement member on the base member 600 to extend through the spring member 500 as discussed below. However, one of skill in the art in possession of the present disclosure will recognize that the spring member 500 may be provided between the support member 400 and the base member 600 in a variety of manners that will fall within the scope of the present disclosure. Furthermore, one of skill in the art in possession of the present disclosure will appreciate that spring members provided for the fingerprint reader/power button system of the present disclosure may be provided in a variety of configurations that will fall within the scope of the present disclosure as well.

In the illustrated example, a plurality of spring legs 508 extend from the spring member 500, with a pair of spring legs 508 extending from opposite sides of the spring base mounting portion 502, and a pair of spring legs 508 extending from opposite sides of the spring base mounting portion 504. Furthermore, each of the spring legs 508 in the illustrated example includes a distal end that is located opposite that spring leg from the spring base mounting portion 502 or 504 from which it extends, and is provided in a shape that defines a respective spring leg aperture 508a. As discussed in further detail below, each of the spring legs 508 are configured to engage the support member 400 adjacent its distal end while allowing respective support legs 408 on the support member 400 to extend through the respective spring leg apertures 508a defined by those spring legs.

As will be appreciated by one of skill in the art in possession of the present disclosure, the spring legs 508 may be configured such that the distal ends of the spring legs that are configured to engage the support member 400 are located in a different plane than the base member mounting portions 502 and 504 and power actuator engagement element coupling portion 506, which allows the spring member 500 to provide the spring force discussed below. However, while a specific configuration for the spring member 500 that provides a spring force is illustrated and described below, one of skill in the art in possession of the present disclosure will appreciate that the spring force discussed below may be provided by a variety of spring configurations that will fall within the scope of the present disclosure as well. Furthermore, while a specific spring member 500 has been illustrated, one of skill in the art in possession of the present disclosure will recognize that the fingerprint reader/power button system of the present disclosure may include a variety of components and/or component configurations for providing the functionality of the spring member 500 discussed below while remaining within the scope of the present disclosure as well.

Figure 6:
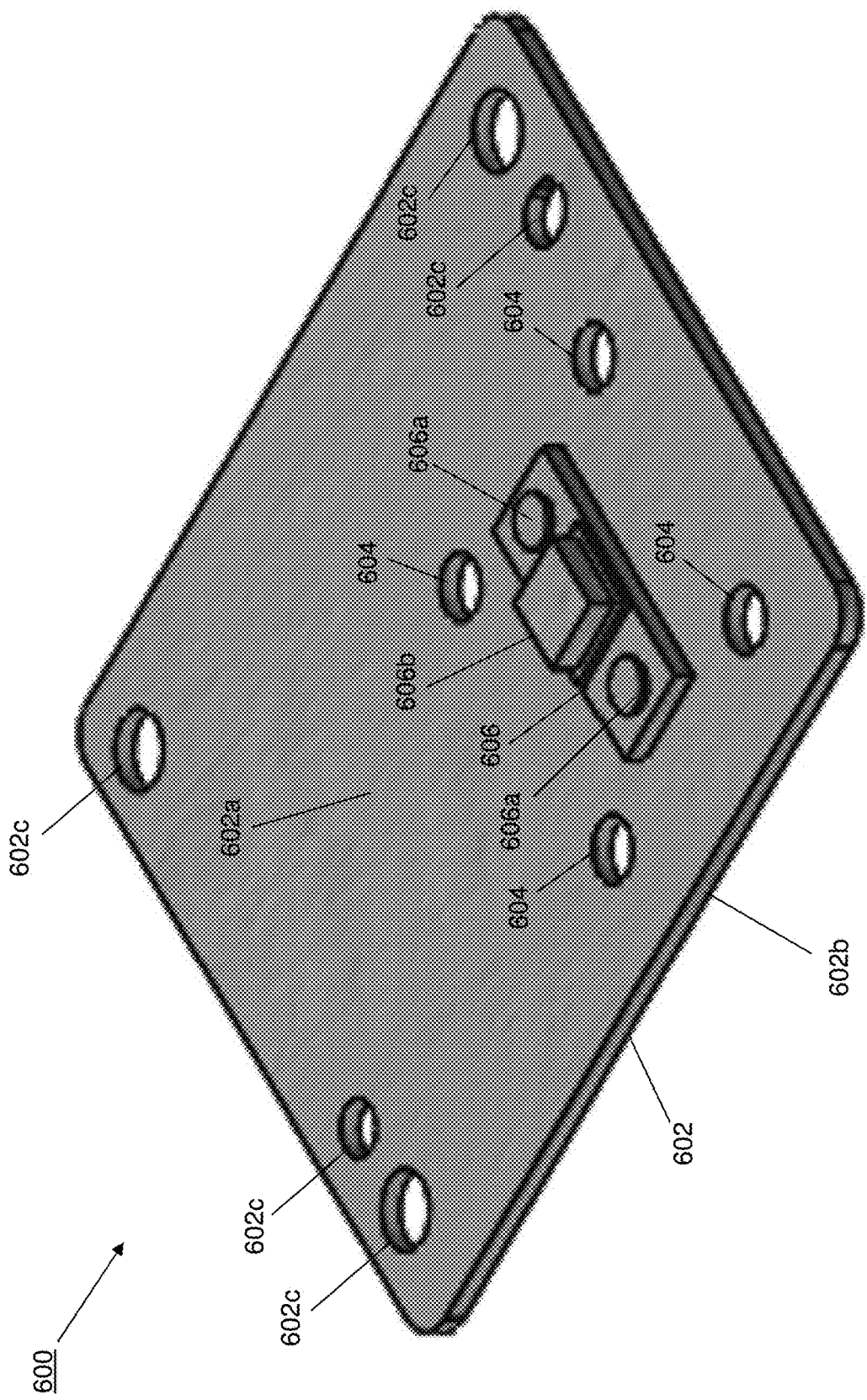
FIG. 6 is a perspective view illustrating an embodiment of a base member included in the fingerprint reader/power button system of FIG. 3.

Referring now to FIG. 6, an embodiment of the base member 600 discussed above with reference to FIG. 3 is described in more detail. In the illustrated embodiment, the base member 600 includes a base 602 having a top surface 602a, and a bottom surface 602b that is located opposite the base 602 from the top surface 602a. Furthermore, the base 602 defines a plurality of chassis mounting apertures 602c that extend through the base 602 from the top surface 602a to the bottom surface 602b, and that as discussed below may be configured to mount the base member 600 to a computing device chassis. However, one of skill in the art in possession of the present disclosure will also recognize that the base 602 of the base member 600 may be integrated as part of a computing device chassis while falling within the scope of the present disclosure as well. In the illustrated embodiment, the base 602 also defines a plurality of base leg apertures 604 that extend through the base 602 from the top surface 602a to the bottom surface 602b and that, as discussed below, are provided to allow respective support legs 408 on the support member 400 to move into them during operation.

A spring coupling member 606 is located on the top surface 602a of the base 602 between the base leg apertures 604, and includes a pair of spring coupling features 606a that may be utilized to mount the spring member 500 to the base member 600, and a power actuator engagement element 606b that is configured to extend through the power actuator engagement member aperture 506a defined by the spring member 500 when the spring member 500 is mounted to the spring coupling features 606a on the base member 600. However, while a specific base member 600 has been illustrated, one of skill in the art in possession of the present disclosure will recognize that the fingerprint reader/power button system of the present disclosure may include a variety of components and/or component configurations for providing the functionality of the base member 600 discussed below while remaining within the scope of the present disclosure as well.

Figure 7:
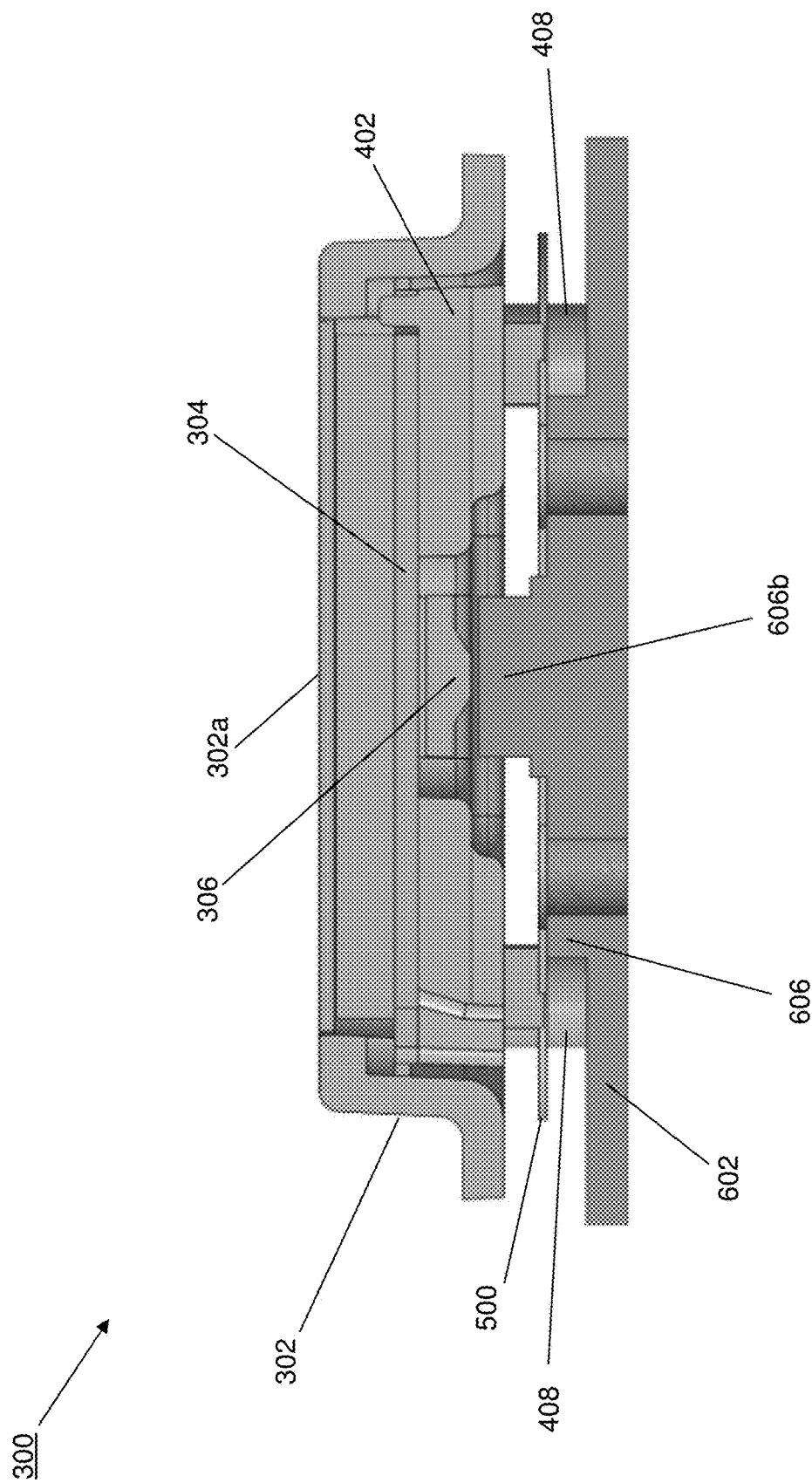
FIG. 7 is a cross-section view illustrating an embodiment of the fingerprint reader/power button system of FIG. 3.

With reference to FIG. 7 (as well as FIGS. 3-6 discussed above), the fingerprint reader/power button system 300 of the present disclosure may be provided by mounting the spring member 500 to the base member 600 by positioning the spring coupling features 606a on the base member 600 discussed above in the respective mounting apertures 502a and 504a defined by the spring base mounting portions 502 and 504 on the spring member 500, which allows the power actuator engagement element 606b to extend through the power actuator engagement member aperture 506a defined by the spring member 500. The support member 400 may then be coupled to the base member 600 by extending the support legs 408 on the support member 400 through the spring leg apertures 508a defined by the spring legs 508 and in (or adjacent) the base leg apertures 604 defined by the base member 600, and in some embodiments the support legs 408 may be located in the base leg apertures 604 in order to provide alignment for the fingerprint reader/power button system 300, and/or may provide heat stakes that lock the support member 400 to the base member 600. However, one of skill in the art in possession of the present disclosure will recognize that the spring member 500 may be provided between the support member 400 and the base member 600 in a variety of manners that will fall within the scope of the present disclosure.

As will be appreciated by one of skill in the art in possession of the present disclosure, the mounting of the spring member 500 to the base member 600 and the coupling of the support member 400 to the base member 600 causes each of the spring legs 508 on the spring member 500 to engage the support member 400, with each support leg 408 on the support member 400 extending through a respective spring leg aperture 508a defined by a respective spring leg 508, and into (or adjacent) a respective base leg aperture 604 defined by the base member 600. Furthermore, the engagement of the spring legs 508 on the spring member 500 with the support member 400 adjacent the support legs 408 of the support member 400 (e.g., at the corners of the support member 400) may provide a user with a feeling of an "even" force needed to press the fingerprint reader/power button key provided by the fingerprint reader/power button system 300 of the present disclosure. The fingerprint reader board 304 may be mounted on the fingerprint reader board mounting surface 404 on the support base 402 of the support member 400, which allows the power actuator element 306 connected to the fingerprint reader board 304 to extend through the power actuator element aperture 406 defined by the support member 400. Finally, the fingerprint reader module 302 may be connected to the support member 400 (and coupled to the fingerprint reader board 304), and the base member 600 may be mounted in (unless it is already integrated as part of) the base chassis 202 of the computing device 200 of FIG. 2 (e.g., via coupling members such as screws that are provided in the chassis mounting apertures 602c on the base 602 and that engage the base chassis 202 of the computing device 200) in order to provide the fingerprint reader/power button key of the present disclosure.

One of skill in the art in possession of the present disclosure will appreciate how the mounting of the spring member 500 to the base member 600 and the coupling of the support member 400 to the base member 600 configures the spring member 500 to provide a spring force that directed toward the support member 400 and away from the base member 600 (e.g., normal to the external surface 302a) due to the engagement of the spring legs 508 with the support member 400.

Figure 8:
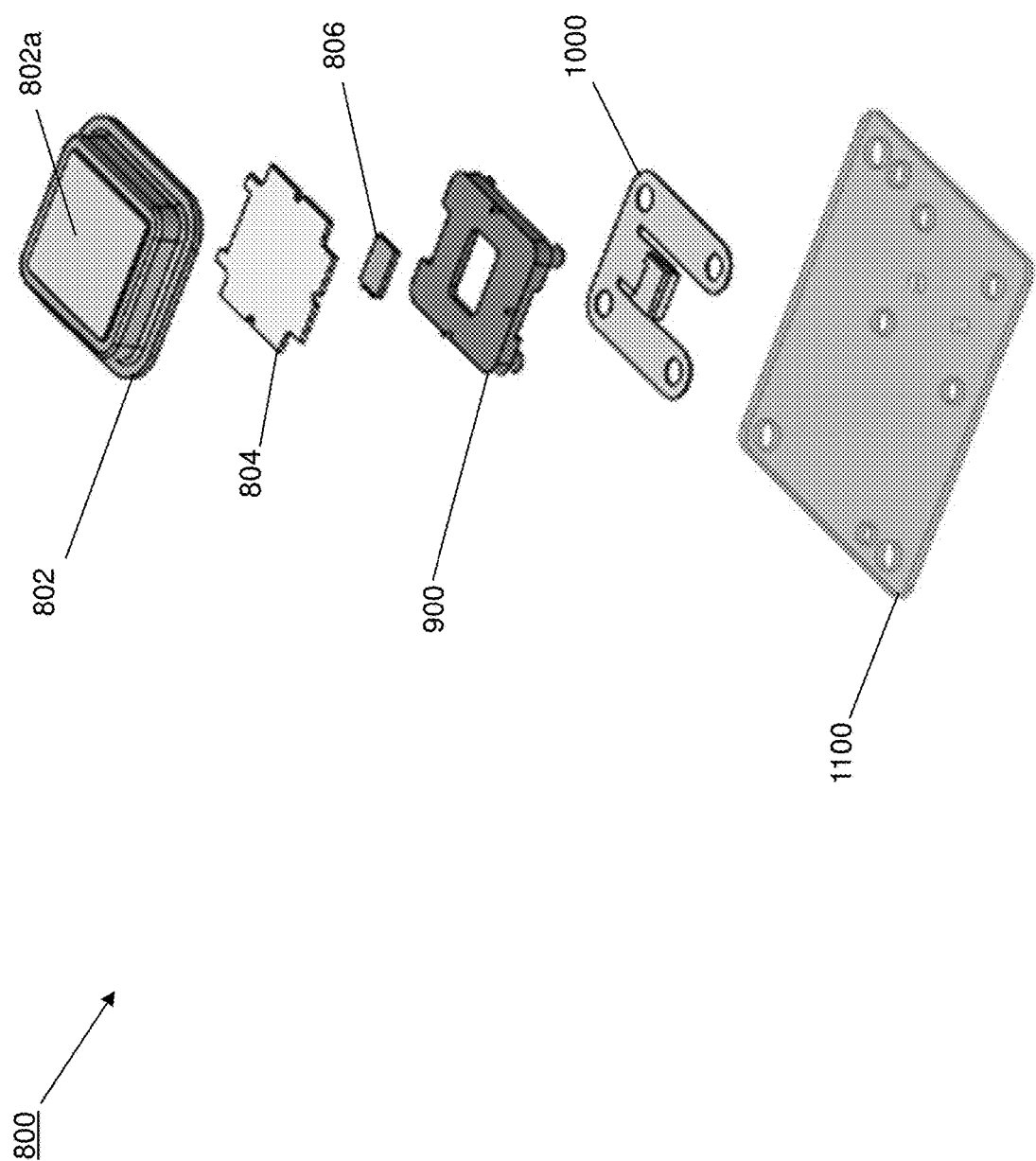
FIG. 8 is an exploded perspective view illustrating an embodiment of a fingerprint reader/power button system that may be provided in the laptop/notebook computing device of FIG. 2.

Referring now to FIG. 8, an exploded view of an embodiment of a fingerprint reader/power button system 800 is illustrated. As discussed above, the fingerprint reader/power button system 800 of the present disclosure may be provided in the computing device 200 discussed above with reference to FIG. 2. As such, the fingerprint reader/power button system 300 may be included on the IHS 100 discussed above with reference to FIG. 1 and/or on a component (e.g., a keyboard device) of the IHS 100. Furthermore, while illustrated and discussed as being provided on a computing device keyboard, one of skill in the art in possession of the present disclosure will recognize that the functionality of the fingerprint reader/power button system 800 discussed below may be provided with other devices that are configured to operate similarly as fingerprint reader/power button system discussed below.

In the illustrated embodiment, the fingerprint reader/power button system 800 includes a fingerprint reader module 802 that, as discussed above, may house at least some of the fingerprint reader components of the fingerprint reader utilized in the fingerprint reader/power button system 800 of the present disclosure, and that provides an external surface 802a of a fingerprint reader/power button key provided by the fingerprint reader/power button system 800 of the present disclosure. As such, the fingerprint reader module 802 may include a glass (or other transparent) element that provides the external surface 802a, and may include (or be coupled to) an optical scanning subsystem, a light sensor subsystem, a Charge Coupled Device (CCD), and/or other fingerprint reader components that would be apparent to one of skill in the art in possession of the present disclosure. In the illustrated embodiment, the fingerprint reader/power button system 800 also includes a fingerprint reader board 304 that may be located adjacent a bottom surface of the fingerprint reader module 802 (not visible in FIG. 8, but located opposite the external surface 802) and coupled to one or more of the fingerprint reader components in the fingerprint reader module 802, as well as to one or more components in the computing device 200 in which the fingerprint reader/power button system 800 is provided. As will be appreciated by one of skill in the art in possession of the present disclosure, the fingerprint reader board 804 may be provided using a variety of circuit board components known in the art.

In the illustrated embodiment, a power actuator element 806 may be connected to a surface of the fingerprint reader board 804 that is opposite the fingerprint reader board 804 from the fingerprint reader module 302, and the fingerprint reader board 804 may be mounted to a support member 900 (discussed in further detail below with reference to FIG. 9). As discussed below, the power actuator element 806 may be coupled (e.g., via the fingerprint reader board 804, via a separate coupling, etc.) to a power system in the computing device 200 such that its actuation (discussed in further detail below) causes power to be provided from the power system to the computing device 200. A spring member 1000 (discussed in further detail below with reference to FIG. 10) is located between the support member 900 and a base member 1100 (discussed in further detail below with reference to FIG. 11), with the spring member 1000 engaging the base member 1100 to provide a spring force that biases the support member 900 (e.g., via contact with the power actuator element 806) away from the base member 1100. However while a specific fingerprint reader/power button system 800 has been illustrated, one of skill in the art in possession of the present disclosure will recognize that the fingerprint reader/power button system of the present disclosure may include a variety of components and/or component configurations for providing conventional fingerprint reader/power button system functionality, as well as the functionality discussed below, while remaining within the scope of the present disclosure as well.

Figure 9:
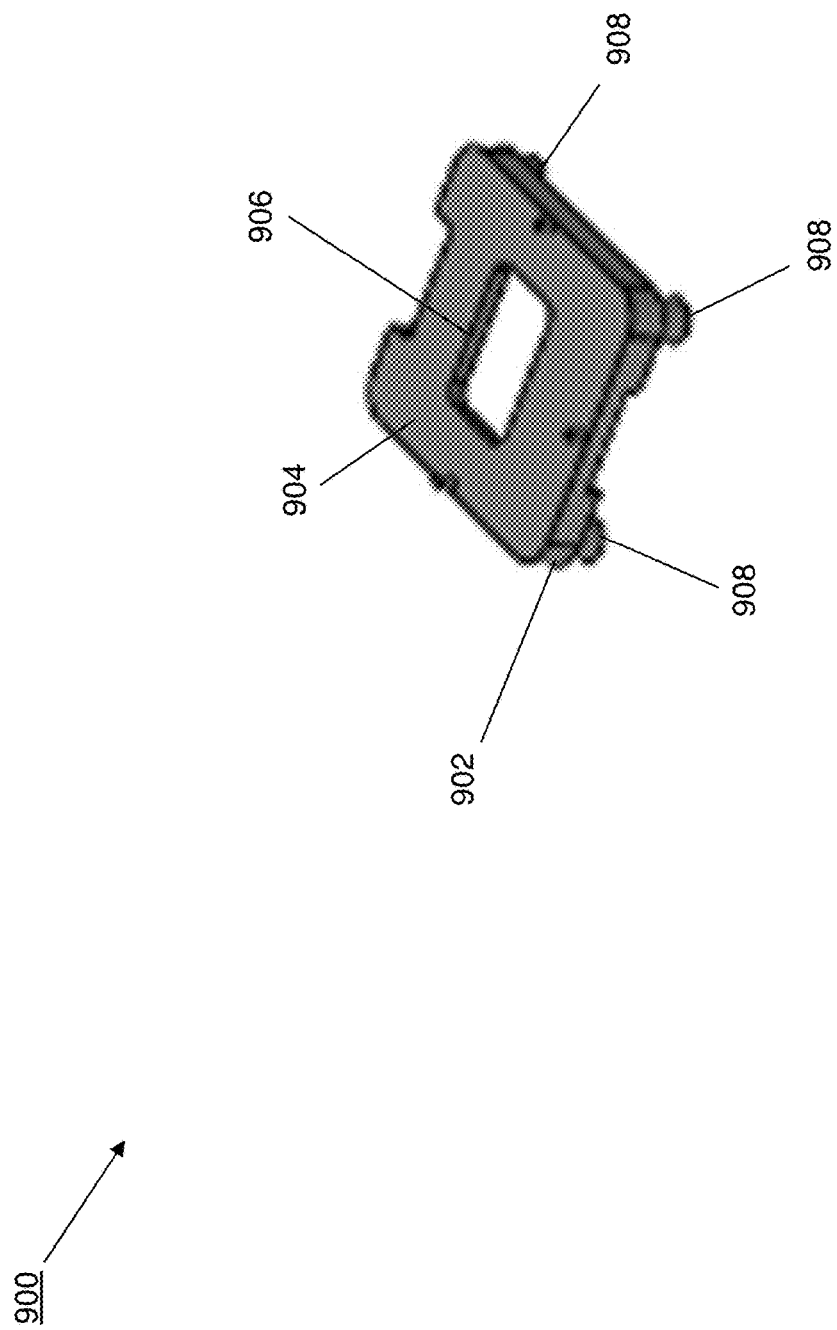
FIG. 9 is a perspective view illustrating an embodiment of a support member included in the fingerprint reader/power button system of FIG. 8.

Referring now to FIG. 9, an embodiment of the support member 900 discussed above with reference to FIG. 8 is described in more detail. In the illustrated embodiment, the support member 900 includes a support base 902 that defines a fingerprint reader board mounting surface 904 that is configured to allow the fingerprint reader board 804 discussed above with reference to FIG. 8 to mount to the support base 902 and, as such, may include any of a variety of board mounting, coupling, and/or securing features that would be apparent to one of skill in the art in possession of the present disclosure. Furthermore, the support base 902 also defines a power actuator element mounting aperture 906 that is configured to allow the power actuator element 806 discussed above with reference to FIG. 8 to extend through the support base 902 such that it is accessible via a bottom surface of the support base 902 (not visible in FIG. 9, but opposite the support base 902 from the fingerprint reader board mounting surface 904). A plurality of support legs 908 extend from the support base 902 and, in the illustrated embodiment, include four support legs 908 that extend from each of the corners of the substantially square-shaped support base 902 illustrated in FIG. 9. However, while a specific support member 900 has been illustrated, one of skill in the art in possession of the present disclosure will recognize that the fingerprint reader/power button system of the present disclosure may include a variety of components and/or component configurations for providing the functionality of the support member 900 discussed below while remaining within the scope of the present disclosure as well.

Figure 10A:
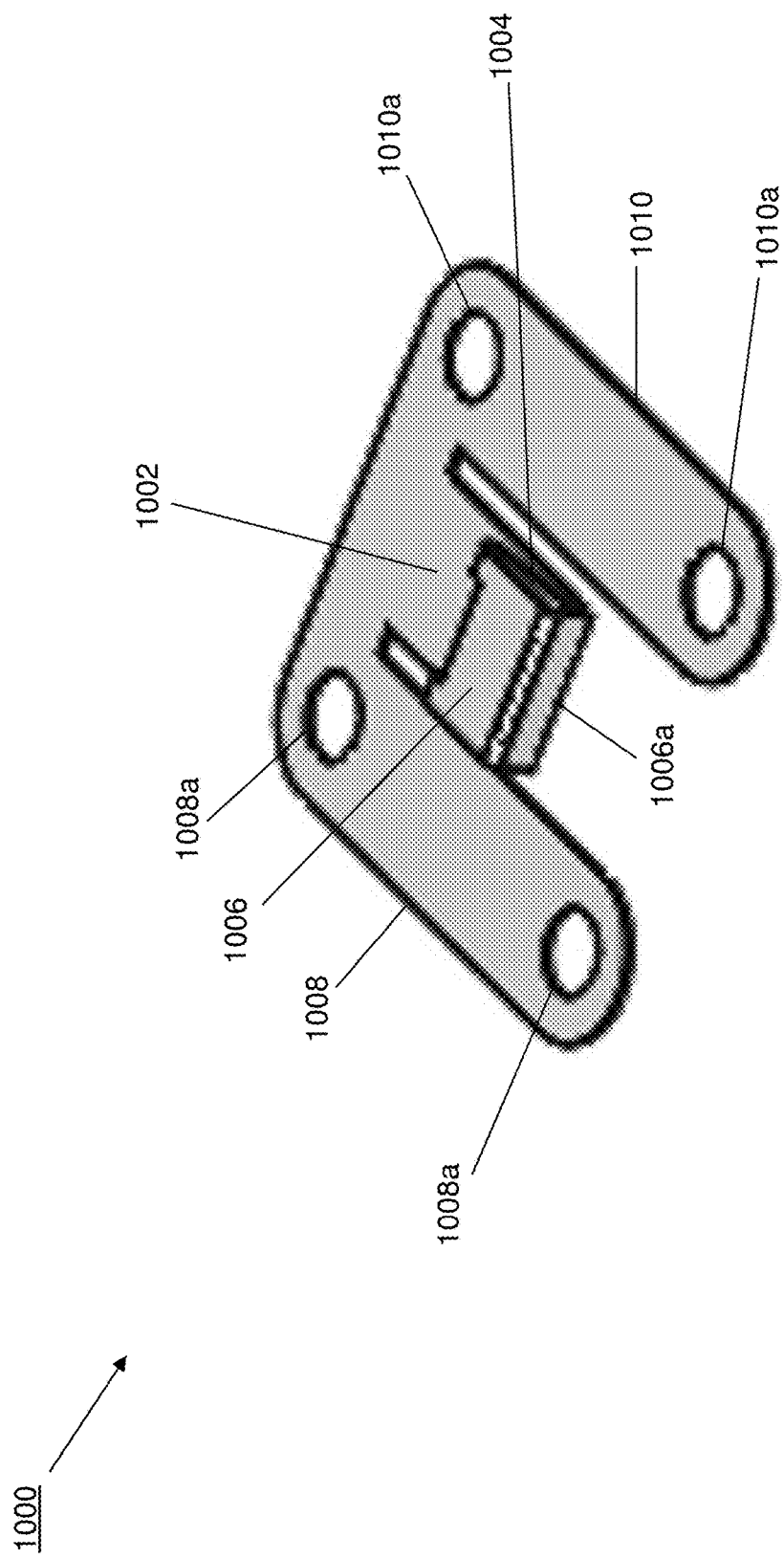
FIG. 10A is a perspective view illustrating an embodiment of a spring member included in the fingerprint reader/power button system of FIG. 8.
Figure 10B:
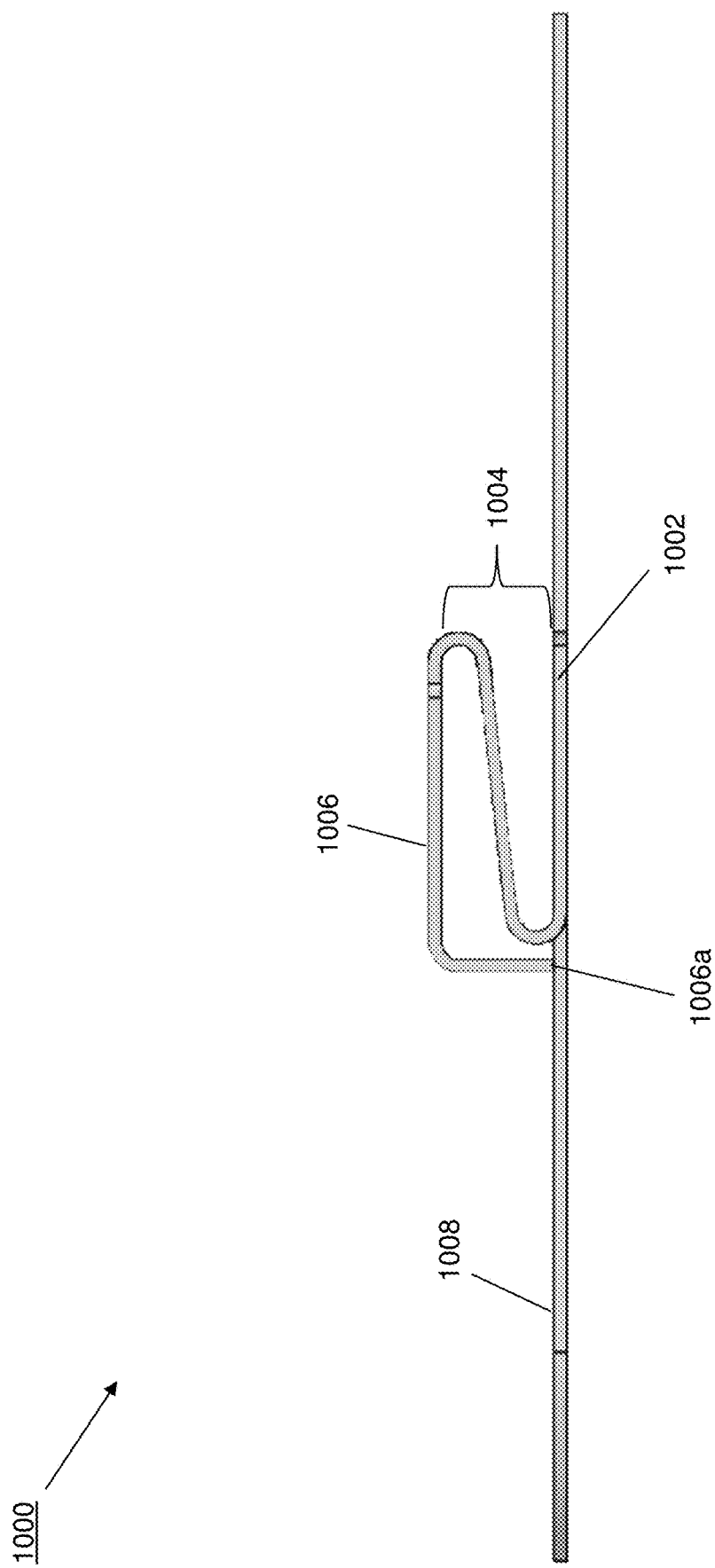
FIG. 10B is a side view illustrating an embodiment of the spring member of FIG. 10A.

Referring now to FIGS. 10A and 10B, an embodiment of the spring member 1000 discussed above with reference to FIG. 8 is described in more detail. In the illustrated embodiment, the spring member 1000 includes a base portion 1002 with a spring portion 1004 connecting a power actuator engagement member 1006 on the spring member 1000 to the base portion 1002. However, one of skill in the art in possession of the present disclosure will recognize that the spring member 1000 may be provided between the support member 900 and the base member 1100 in a variety of manners that will fall within the scope of the present disclosure. As discussed below, the power actuator engagement member 1006 includes a base member engagement surface 1006a that is configured to engage the base member 1100 in order to allow the power actuator engagement member 1006 to activate the power actuator element 806, discussed in further detail below. However, one of skill in the art in possession of the present disclosure will appreciate that spring members provided for the fingerprint reader/power button system of the present disclosure may be provided in a variety of configurations that will fall within the scope of the present disclosure as well.

In the illustrated example, a pair of spring legs 1008 and 1010 extend from the spring member 1000, with a first spring leg 1008 extending from a first side of the base portion 1002, and a second spring leg 1010 extending from a second side of the base portion 1002 that is opposite the base portion 1002 from the first side. Furthermore, the spring leg 1008 defines a pair of respective spring leg apertures 1008a, and the spring leg 1010 defines a pair of respective spring leg apertures 1010a. As discussed in further detail below, each of the spring legs 1008 and 1010 are configured to allow respective support legs 908 on the support member 900 to move through the respective spring leg apertures 1008a and 1010a defined by those spring legs.

As will be appreciated by one of skill in the art in possession of the present disclosure, the spring legs 1008 and 1010 may be configured to engage the base member 1100 while allowing the spring portion 1004 of the spring member 1000 to engage the support member 900 to provide the spring force discussed below. However, while a specific configuration for the spring member 1000 that provides a spring force is illustrated and described below, one of skill in the art in possession of the present disclosure will appreciate that the spring force discussed below may be provided by a variety of spring configurations that will fall within the scope of the present disclosure as well. Furthermore, while a specific spring member 1000 has been illustrated, one of skill in the art in possession of the present disclosure will recognize that the fingerprint reader/power button system of the present disclosure may include a variety of components and/or component configurations for providing the functionality of the spring member 1000 discussed below while remaining within the scope of the present disclosure as well.

Figure 11:
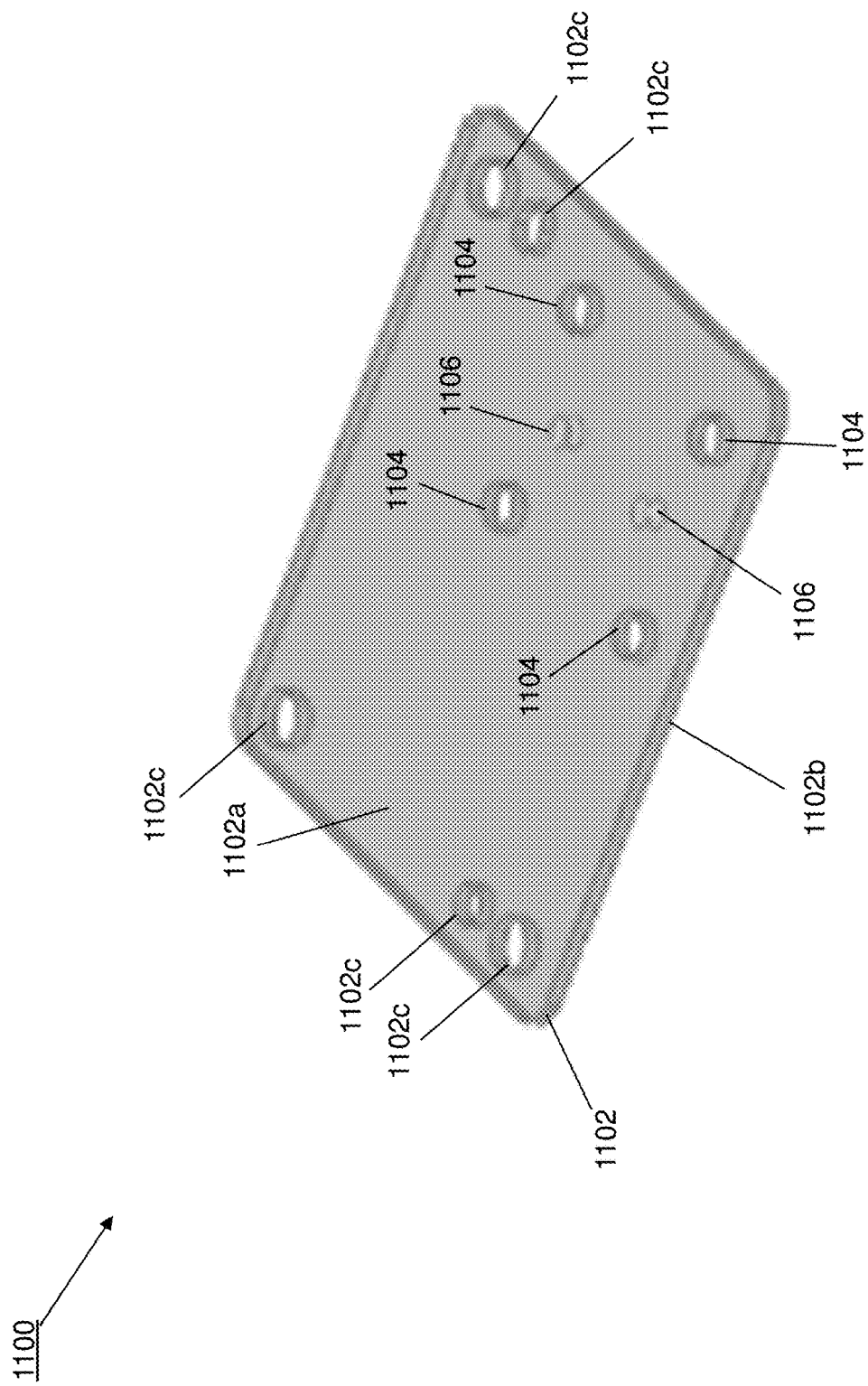
FIG. 11 is a perspective view illustrating an embodiment of a base member included in the fingerprint reader/power button system of FIG. 8.

Referring now to FIG. 11, an embodiment of the base member 1100 discussed above with reference to FIG. 8 is described in more detail. In the illustrated embodiment, the base member 1100 includes a base 1102 having a top surface 1102a, and a bottom surface 1102b that is located opposite the base 1102 from the top surface 1102a. Furthermore, the base 1102 defines a plurality of chassis mounting apertures 1102c that extend through the base 1102 from the top surface 1102a to the bottom surface 1102b, and that as discussed below may be configured to mount the base member 1100 to a computing device chassis. However, one of skill in the art in possession of the present disclosure will also recognize that the base 1102 of the base member 1100 may be integrated as part of a computing device chassis while falling within the scope of the present disclosure as well. In the illustrated embodiment, the base 1102 also defines a plurality of base leg apertures 1104 that extend through the base 1102 from the top surface 1102a to the bottom surface 1102b and that, as discussed below, are provided to allow respective support legs 908 on the support member 900 to move into (or through) them during operation.

A pair of spring member mounting apertures 1106 are defined by the base 1102, extend through the base 1102 from the top surface 1102a to the bottom surface 1102b, and as discussed below are configured to mount the spring member 1000 to the base member 1100. However, one of skill in the art in possession of the present disclosure will recognize that the spring member 1000 may be provided between the support member 900 and the base member 1100 in a variety of manners that will fall within the scope of the present disclosure. For example, the spring member 1000 may rest on the base member 1100 (and between the support member 900 and the base member 1100) without being mounted to the base member 1100. Furthermore, while a specific base member 1100 has been illustrated, one of skill in the art in possession of the present disclosure will recognize that the fingerprint reader/power button system of the present disclosure may include a variety of components and/or component configurations for providing the functionality of the base member 1100 discussed below while remaining within the scope of the present disclosure as well.

Figure 12A:
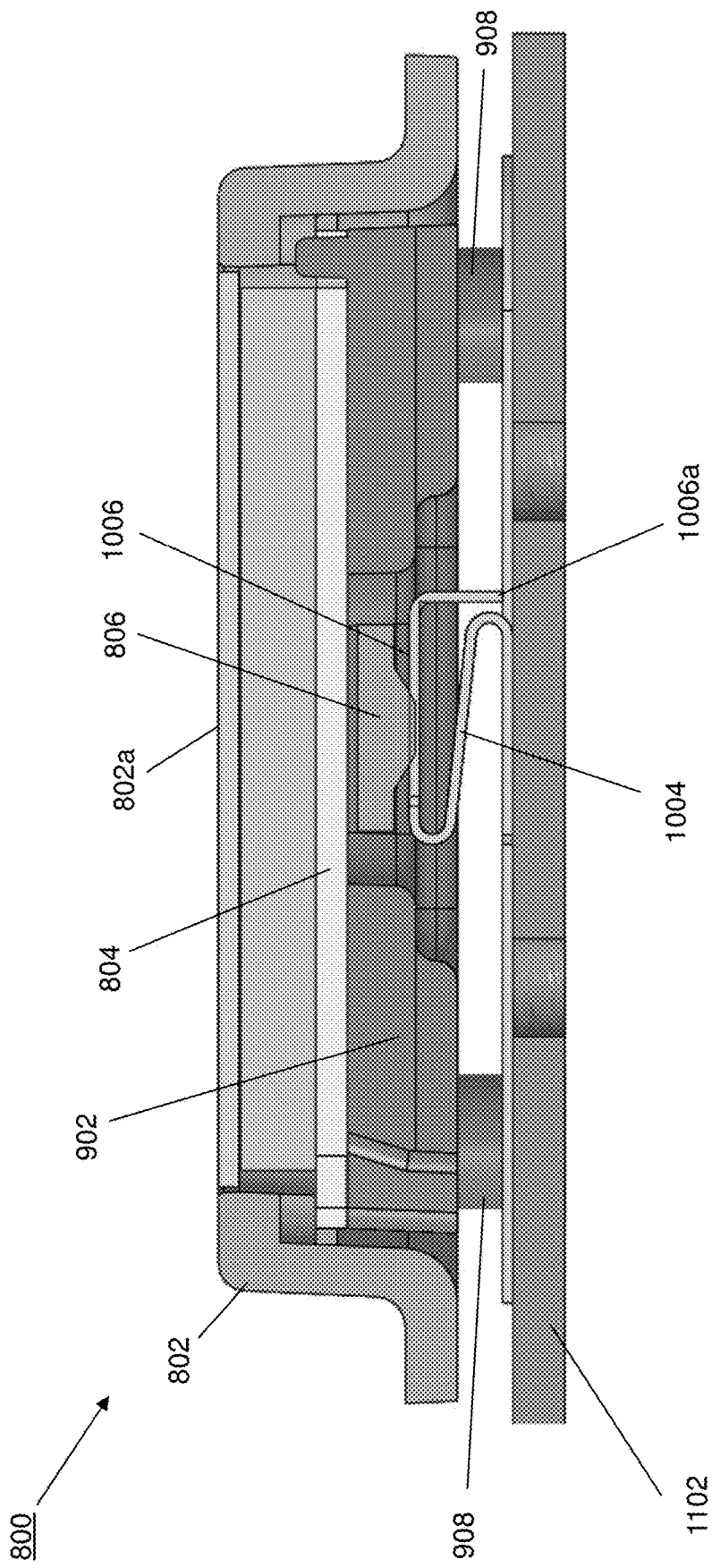
FIG. 12A is a cross-section view illustrating an embodiment of the fingerprint reader/power button system of FIG. 8.

With reference to FIG. 12 (as well as FIGS. 8-11 discussed above), the fingerprint reader/power button system 800 of the present disclosure may be provided by providing the spring member 1000 on the base member 1100 (e.g., by coupling the base portion 1002 of the spring member 1000 to the spring member mounting apertures 1106 on the base member 1100, or positioning (e.g., resting) the spring member 1000 on the base member 1100 as discussed above) such that the respective spring leg apertures 1008a and 1010a defined by the spring legs 1008 and 1010 are aligned with the base leg apertures 1104 defined by the base member 1100. The support member 900 is then coupled to the base member 1100 by positioning the support legs 908 on the support member 900 in the spring leg apertures 1008a and 1010a on the spring legs 1008 and 1010 and the base leg apertures 1104 defined by the base 1102 of the base member 1100, and in some embodiments the support legs 908 may provide heat stakes that lock the support member 900 to the base member 1100. However, one of skill in the art in possession of the present disclosure will recognize that the spring member 1000 may be provided between the support member 900 and the base member 1100 in a variety of manners that will fall within the scope of the present disclosure.

As will be appreciated by one of skill in the art in possession of the present disclosure, the mounting of the spring member 1000 to the base member 1100 and the coupling of the support member 900 to the base member 1100 causes each of the spring legs 1008 and 1010 on the spring member 1000 to engage the top surface 1102a of the base member 1100, with each support leg 908 on the support member 900 extending through respective spring leg apertures 1008a and 1010a defined by respective spring legs 1008 and 1010, and into a respective base leg aperture 1104 defined by the base member 1100. The fingerprint reader board 804 may then be mounted on the fingerprint reader board mounting surface 904 on the support base 902 of the support member 900, which allows the power actuator element 806 mounted to the fingerprint reader board 804 to extend through the power actuator element mounting aperture 906 defined by the support member 900. Finally, the fingerprint reader module 802 may be connected to the support base 900 (and coupled to the fingerprint reader board 804), and the base member 1100 may be mounted in (or integrated as part of) the base chassis 202 of the computing device 200 of FIG. 2 (e.g., via coupling members such as screws that are provided in the chassis mounting apertures 1102c on the base 1102 and that engage the base chassis 202 of the computing device 200) in order to provide the fingerprint reader/power button key of the present disclosure.

Figure 12B:
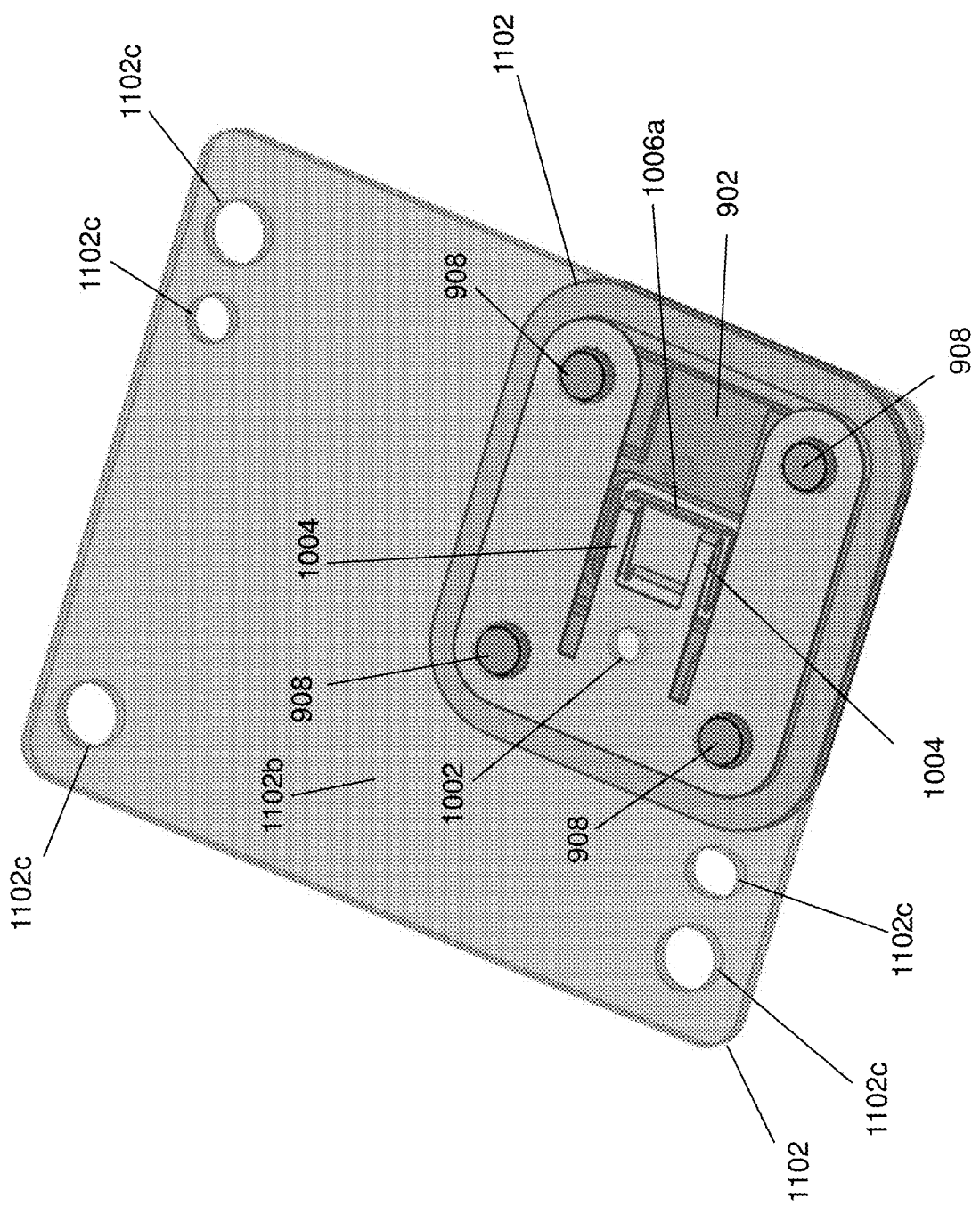
FIG. 12B is a bottom partially transparent perspective view illustrating an embodiment of the fingerprint reader/power button system of FIG. 8.

One of skill in the art in possession of the present disclosure will appreciate how the mounting of the spring member 1000 to the support member 900 and the coupling of the support member 900 to the base member 1100 configures the spring portion 1004 of the spring member 1000 to provide a spring force that is directed toward the support member 900 and away from the base member 1100 due to the engagement of the spring legs 1008 and 1010 with the top surface 1102a of the base member 1100. One of skill in the art in possession of the present disclosure will recognize how the fingerprint reader/power button key illustrated in FIG. 12B illustrates a transparent base member 1100 to provide enhanced visibility of the spring member 1000.

Referring now to FIG. 13, an embodiment of a method 1300 for providing a fingerprint reader/power button key is illustrated. As discussed below, the systems and methods of the present disclosure provide a combined fingerprint reader/power button key with a relatively low profile/stack height that allows for a reduction in the thickness of the chassis in which it is utilized. For example, the fingerprint reader/power button system of the present disclosure may include a base member defining a plurality of base leg apertures that extend into the base member from a first surface on the base member. A spring member having a plurality of spring legs may engage the first surface of the base member to provide a spring force that is directed away from the first surface of the base member, with the plurality of spring legs defining respective spring leg apertures that are located adjacent respective base leg apertures. A support member may engage the spring member and include a plurality of support legs that are configured to extend through the spring leg apertures and into the base leg apertures. A power actuator element may be connected to the support member and configured to engage a power actuator engagement element when an actuation force is provided on the support member that overcomes the spring force, and a fingerprint reader may be connected to the support member and configured to read a fingerprint from a finger that engages a fingerprint reader surface on the fingerprint reader. As discussed below, the components and component configuration of the fingerprint reader/power button system of the present disclosure provide a combined fingerprint reader/power button key with a reduced profile/stack height relative to conventional fingerprint reader/power button keys.

Figure 14:
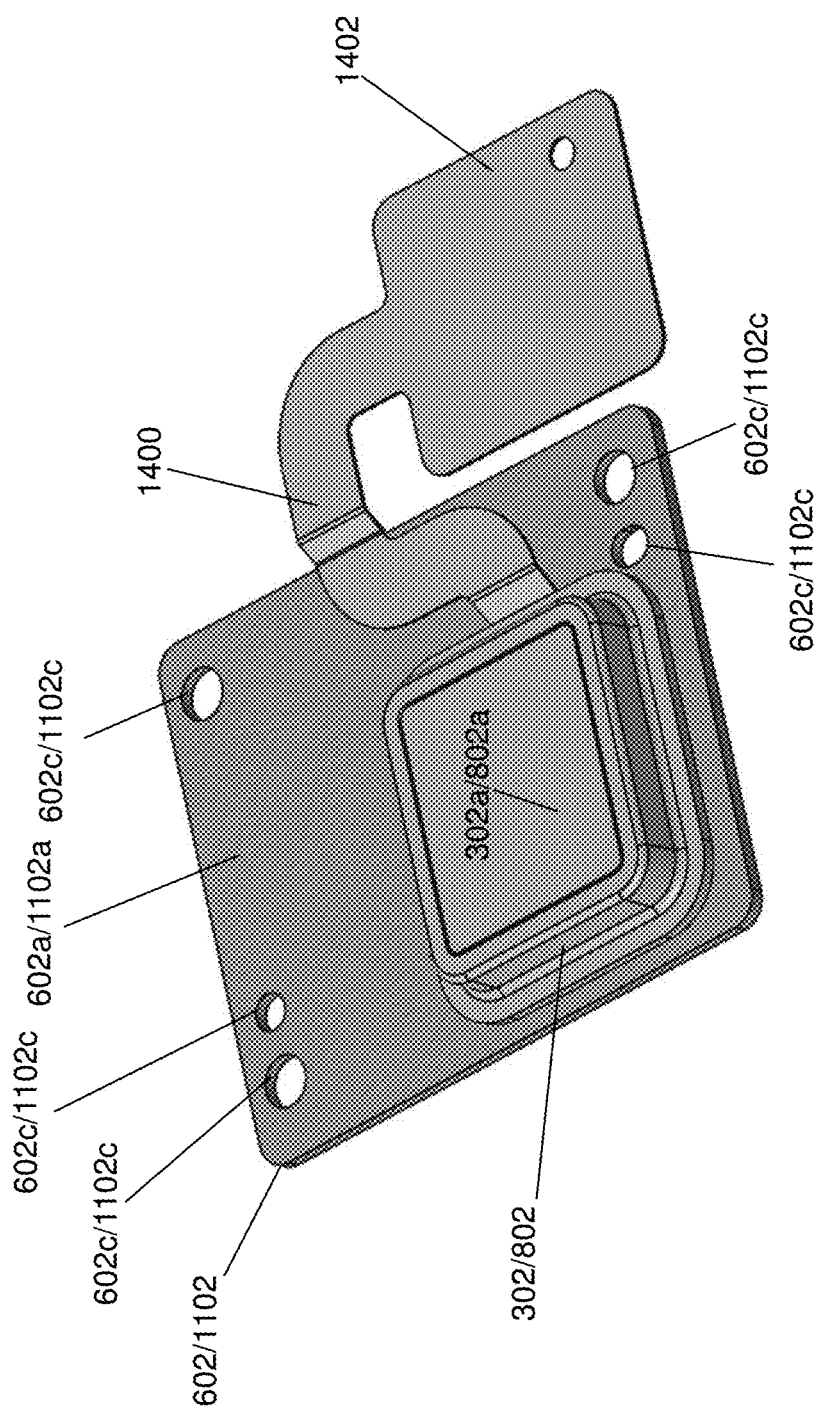
FIG. 14 is a perspective view illustrating an embodiment of the fingerprint reader/power button system of FIG. 3 or 8 provided in the laptop/notebook computing device of FIG. 2.
Figure 15:
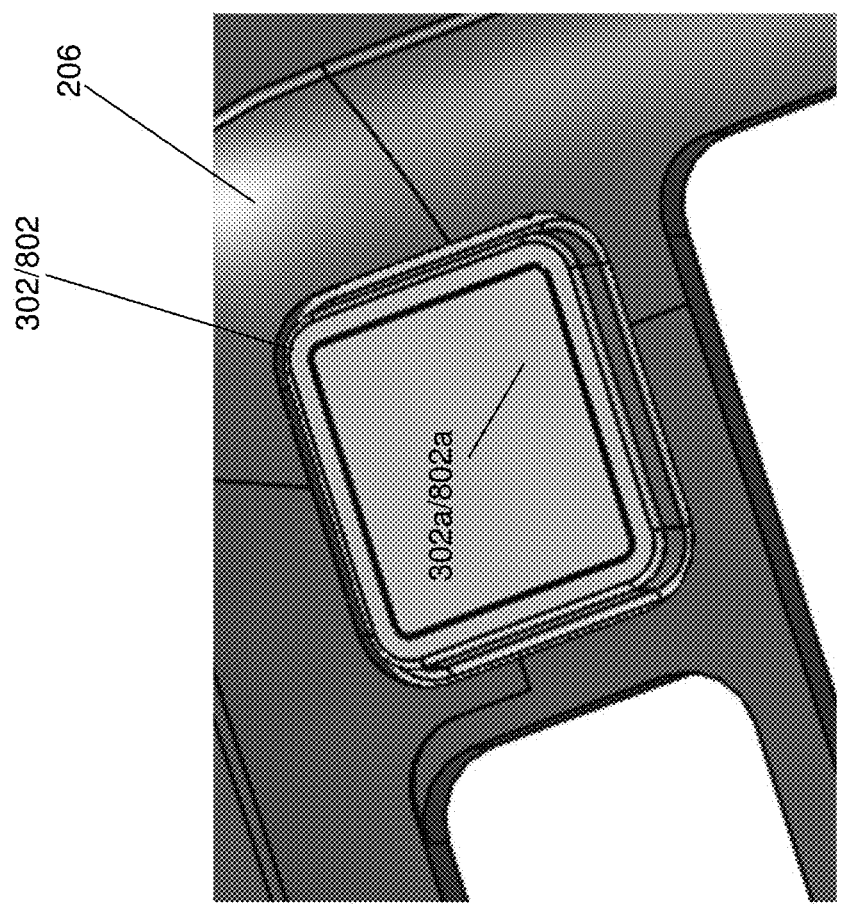
FIG. 15 is a perspective view illustrating an embodiment of the fingerprint reader/power button system of FIG. 3 or 8 provided in the laptop/notebook computing device of FIG. 2.

Referring now to FIG. 14, an embodiment of the fingerprint reader/power button system 300/800 of the present disclosure is illustrated (e.g., with the external surface 302a/802a of the fingerprint reader module 302/802 and the base member 602/1102 visible in FIG. 14) with coupling 1400 (e.g., a Flexible Printed Circuit (FPC) in the illustrated embodiment, a ribbon cable, etc.) that may be connected to the fingerprint reader board 304 and that includes a cable connector 1402. However, while a specific cable connector 1402 is illustrated, one of skill in the art in possession of the present disclosure will appreciate that the coupling 1400 may extend to any connection in the computing device 200 while remaining within the scope of the present disclosure as well. With reference to FIG. 15, the fingerprint reader/power button system 300/800 may then be provided as a key (e.g., one of the keys 206a or 206b, or one of the keys 206c or 206d) included in the keyboard 206 on the base chassis 202 of the computing device 200 by securing the base member 602/1102 to the base chassis 202, providing the base member 602/1102 integrated as part of the base chassis 202, and/or otherwise connecting the fingerprint reader/power button system 300/800 to the computing device 200 such that the external surface 302a/802a of the of the fingerprint reader module 302/802 provides an external surface of a key on the keyboard 206. Furthermore, the cable connector 1402 may be connected to a board (e.g., a motherboard or other circuit board known in the art) in the base chassis 202 in order to couple the fingerprint reader board 304 (and the fingerprint reader components coupled to that fingerprint reader board 304) to the computing device 200 (e.g., a processing system in the computing device 200). Furthermore, one of skill in the art in possession of the present disclosure will appreciate how the power actuator element 306 may also be coupled to the computing device 200 (e.g., a processing system in the computing device 200) in order to allow the power actuation functionality discussed below.

Figure 16:
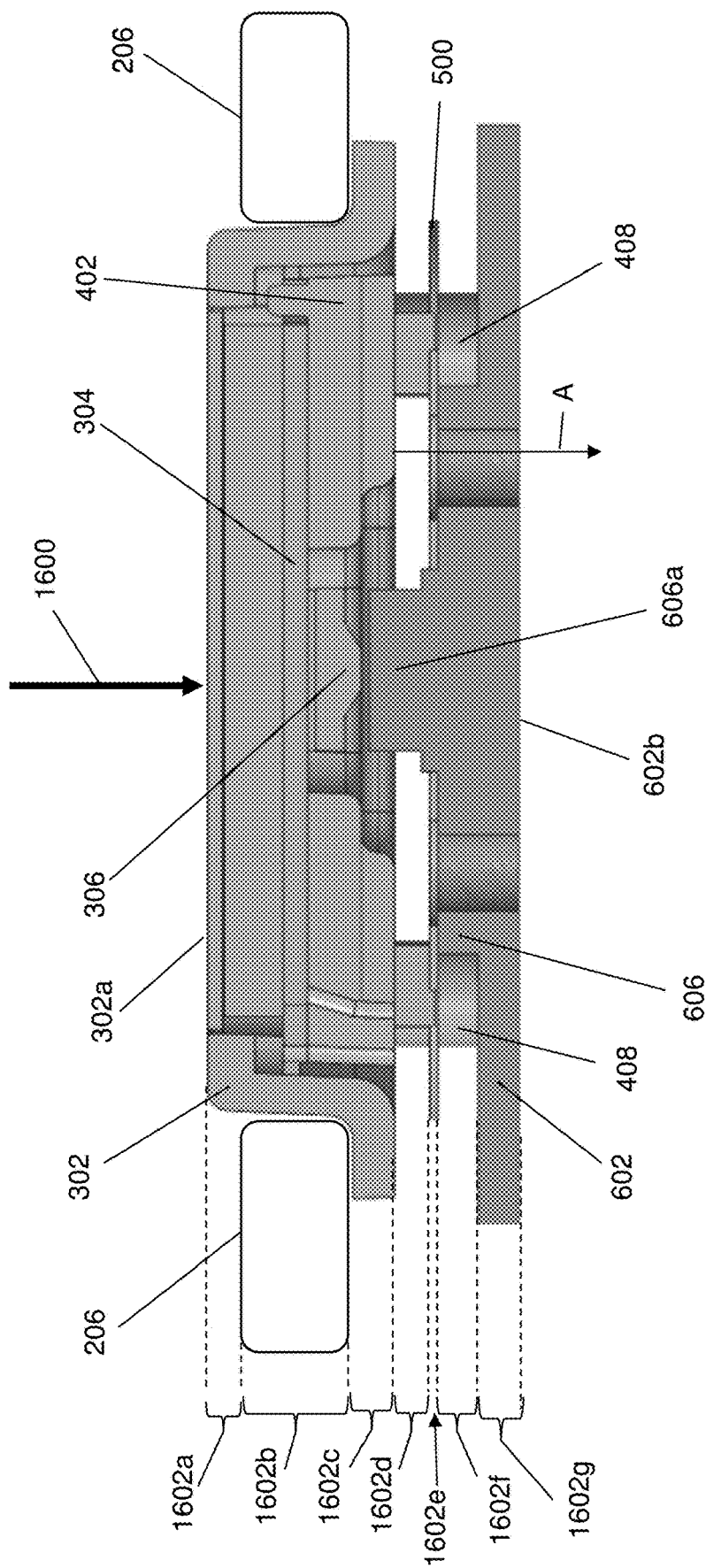
FIG. 16 is a cross-section view illustrating an embodiment of the fingerprint reader/power button system of FIG. 3 provided in the laptop/notebook computing device of FIG. 2.

With reference to FIG. 16, the fingerprint reader/power button system 300 of the present disclosure is illustrated on the keyboard 206 in the base chassis 202 of the computing device 200. Similarly, with reference to FIG. 18, the fingerprint reader/power button system 800 of the present disclosure is illustrated on the keyboard 206 in the base chassis 202 of the computing device 200. FIG. 16 provides a specific example of a stack height (e.g., an approximately 3.5 mm stack height) for the fingerprint reader/power button system 300 of the present disclosure, with a key protrusion height 1602a of approximately 0.5 mm, a base chassis wall thickness 1602b of approximately 1.3 mm, a fingerprint reader module wall thickness 1602c of approximately 0.5 mm, a fingerprint reader module/spring member gap/clearance 1602d of approximately 0.2 mm, a spring member thickness 1602e of approximately 0.1 mm, a support member travel distance 1602f of approximately 0.4 mm, and a base member wall thickness 1602g of approximately 0.5 mm. Furthermore, one of skill in the art in possession of the present disclosure will appreciate how the fingerprint reader/power button system 800 may provide a reduction in stack height relative to the fingerprint reader/power button system 300 by eliminating the fingerprint reader module/spring member gap/clearance 1602d discussed above. However, while a specific example of a fingerprint reader/power button system stack height is provided, one of skill in the art in possession of the present disclosure will appreciate that stack heights of fingerprint reader/power button systems of the present disclosure may vary while remaining within the scope of the present disclosure as well.

The method 1300 begins at block 1302 where a fingerprint reader on the fingerprint reader/power button key reads a fingerprint. In an embodiment, at block 1302, a user may engage their finger (e.g., an index finger, a thumb, etc.) with the external surface 302a/802a of the fingerprint reader module 302/802 while providing an actuation force on the external surface 302a/802a of the fingerprint reader module 302/802 (discussed in further detail below), which allows the fingerprint reader components included in and/or coupled to the fingerprint reader module 302/802 to utilize any of a variety of techniques to "read" fingerprint information associated with a fingerprint of the user's finger (e.g., capturing fingerprint information such as an image of the user's finger, etc.) The fingerprint reader components included in and/or coupled to the fingerprint reader module 302/802 may then compare that fingerprint information with authenticated fingerprint information that was previously provided by the user of the computing device 200 in order to determine whether that fingerprint information matches the authenticated fingerprint information.

In some embodiments, a fingerprint read at block 1302 may be utilized to authenticate and allow or disallow the use of the computing device 200 by enabling or disabling the provisioning of power to the computing device 200 (e.g., based on the power actuation functionality associated with the power actuator element 306 discussed below) using the authenticated fingerprint. As such, in response to the fingerprint information matching the authenticated fingerprint information, the fingerprint reader components included in and/or coupled to the fingerprint reader module 302/802 may enable the provisioning of power to the computing device 200 via the power actuation functionality associated with the power actuator element 306 discussed below, while in the event the fingerprint information fails to match the authenticated fingerprint information, the fingerprint reader components included in and/or coupled to the fingerprint reader module 302/802 may disable the provisioning of power to the computing device 200 via the power actuation functionality associated with the power actuator element 306 discussed below. However, in other embodiments, the power actuation functionality associated with the power actuator element 306 discussed below may always be enabled, and the fingerprint read at block 1302 may be utilized to authenticate and allow or disallow the use of the computing device 200 by enabling or disabling access to an operating system of the computing device 200. As such, one of skill in the art in possession of the present disclosure will appreciate how the fingerprint read at block 1302 may be utilized to perform fingerprint authentication operations to allow or disallow access to the computing device 200, and those fingerprint authentication operations may occur during the performance of at least a portion of the other blocks of the method 1300.

The method 1300 then proceeds to block 1304 where an actuation force is applied to the fingerprint reader/power button key. As discussed above, while engaging their finger (e.g., an index finger, a thumb, etc.) with the external surface 302a/802a of the fingerprint reader module 302/802, the user may provide an actuation force on the external surface 302a/802a of the fingerprint reader module 302/802. With reference to FIG. 16, an actuation force 1600 is illustrated as being applied to the external surface 302a. Similarly, with reference to FIG. 18, an actuation force 1800 is illustrated as being applied to the external surface 802a. As such, the action of "pressing" the fingerprint reader/power button key provided by the fingerprint reader/power button system 300/800 may operate to allow the fingerprint reader/power button system 300/800 to read a fingerprint while being pressed.

Figure 18:
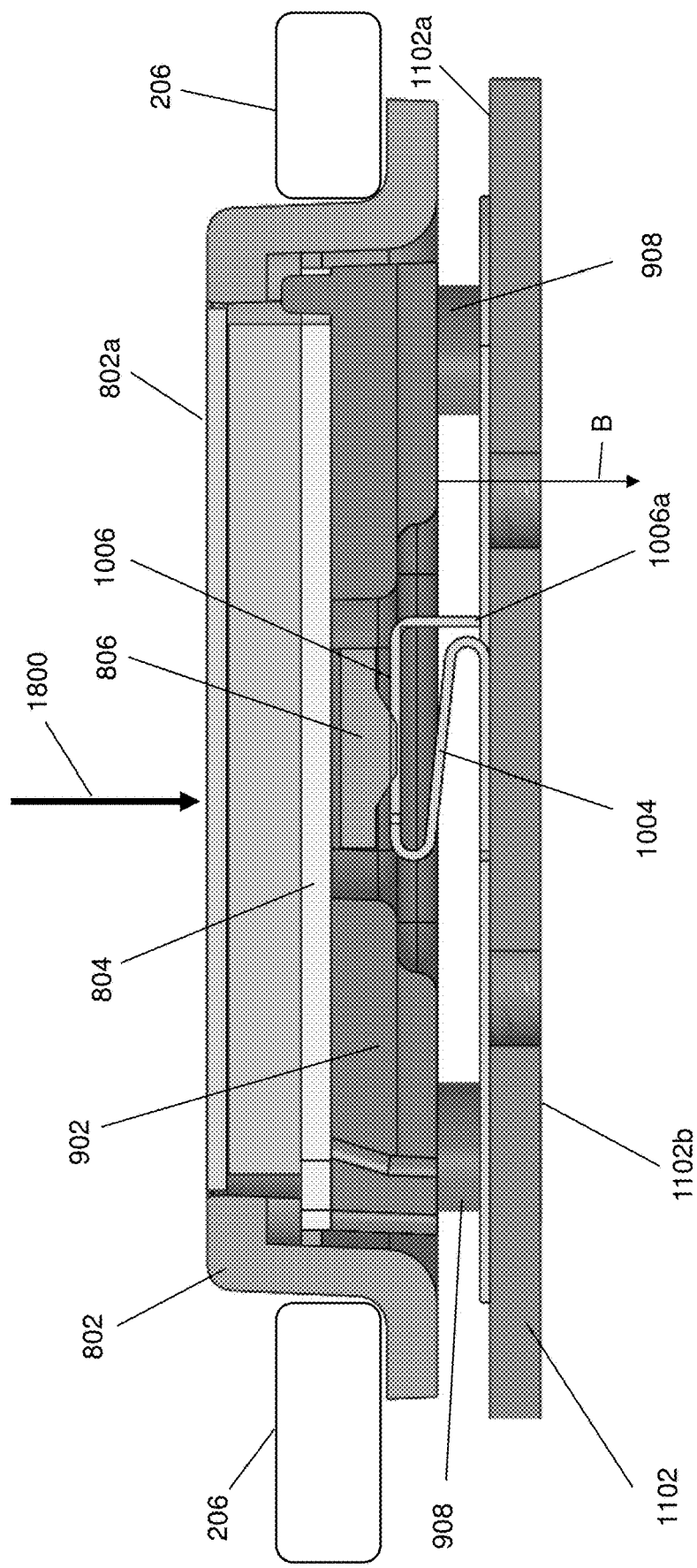
FIG. 18 is a bottom perspective view illustrating an embodiment of the fingerprint reader/power button system of FIG. 8 provided in the laptop/notebook computing device of FIG. 2.

The method 1300 then proceeds to block 1306 where a support member moves in response to the actuation force. As will be appreciated by one of skill in the art in possession of the present disclosure, in an embodiment of block 1306, as the actuation force provided by the finger of the user at block 1304 on the external surface 302a/802a of the fingerprint reader module 302/802 overcomes the spring force provided by the spring member 500/1000, the support member 400/900 will move relative to the base member 600/1100. For example, as the actuation force 1600 provided by the finger of the user at block 1304 on the external surface 302a of the fingerprint reader module 302 overcomes the spring force provided by the spring member 500, the support member 400 will begin to move relative to the base member 600 in a direction A, as illustrated in FIG. 16. Similarly, as the actuation force 1800 provided by the finger of the user at block 1304 on the external surface 802a of the fingerprint reader module 802 overcomes the spring force provided by spring portion 1004 of the spring member 1000, the support member 900 will begin to move relative to the base member 1100 in a direction B, as illustrated in FIG. 18.

Figure 17:
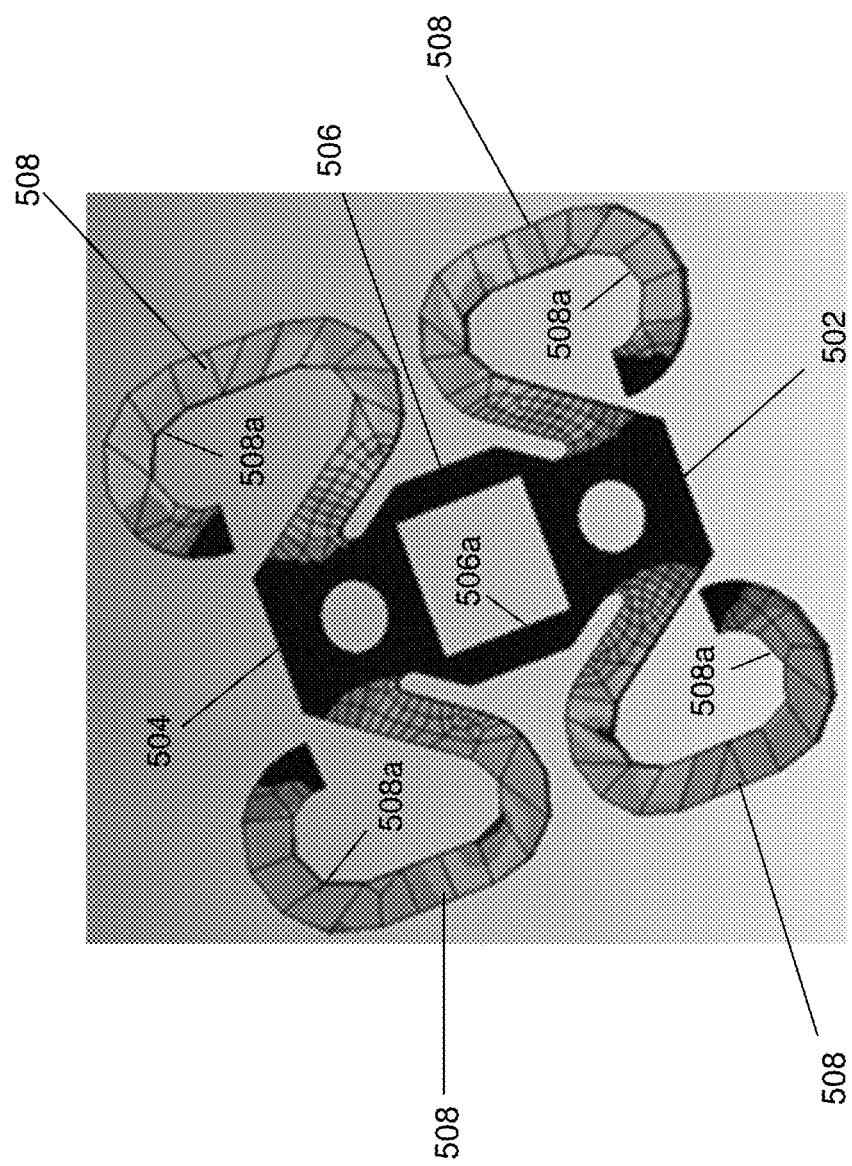
FIG. 17 is a graphical view illustrated an embodiment of the spring member of FIG. 5 during operation of the fingerprint reader/power button system of FIG. 3.

The method 1300 then proceeds to block 1308 where a spring member compresses in response to movement of the support member. In an embodiment, at block 1308 and in response to the movement of the support member 400/900, the spring member 500/1000 will compress. For example, continued application of the actuation force 1600 on the external surface 302a of the fingerprint reader module 302 that overcomes the spring force provided by the spring member 500 will cause a compression of the spring member 500. Similarly, continued application of the actuation force on the external surface 802a of the fingerprint reader module 802 that overcomes the spring force provided by the spring portion 1004 on the spring member 1000 will cause a compression of the spring portion 1004. With reference to FIG. 17, an embodiment of the spring member 500 is illustrated that shows the stress concentrations on the spring member 500 during compression, and one of skill in the art in possession of the present disclosure will appreciate that the stress concentrations illustrated in FIG. 17 indicate a relatively high compression cycling life (i.e., prior to failure) for the spring member 500.

The method 1300 then proceeds to block 1310 where support legs on the support member extend into base leg apertures in a base member. In an embodiment, at block 1310 and in response to the movement of the support member 400/900 and the compression of the spring member 500/1000, the support legs 408/908 on the support member 400/900 will extend into the base leg apertures 604/1104 defined by the base member 600/1100. For example, continued application of the actuation force 1600 on the external surface 302a of the fingerprint reader module 302 that compresses the spring member 500 will result in the movement of the support legs 408 on the support member 400 through the base leg apertures 604 defined by the base member 600. Similarly, continued application of the actuation force on the external surface 802a of the fingerprint reader module 802 that compresses the spring portion 1104 of the spring member 1000 will result in the movement of the support legs 908 on the support member 900 through the base leg apertures 1104 defined by the base member 1100.

As will be appreciated by one of skill in the art in possession of the present disclosure, in some embodiments, the range of motion of the support member 400/900 may be provided such that at least a portion of each of the support legs 408/908 is always located in the base leg apertures 604/1104 defined by the base member 600/1100. However, in other embodiments, the range of motion of the support member 400/900 may be provided such that no portion of the support legs 408/908 are located in the base leg apertures 604/1104 defined by the base member 600/1100 at the beginning of the range of motion of the support members 400/900. However, in either situation, different embodiments of the present disclosure provide the range of motion of the support member 400/900 such that no portion of the support legs 408/908 extend past the bottom surface 602b/

1102*b* of the base member 600/1100 at the end of the range of motion of the support members 400/900. As will be appreciated by one of skill in the art in possession of the present disclosure, preventing the extension of the support legs 408/908 past the bottom surface 602*b*/1102*b* of the base member 600/1100 at the end of the range of motion of the support members 400/900 eliminates the need to provide clearance adjacent the bottom surface 602*b*/1102*b* of the base member 600/1100 to accommodate for the operation of the fingerprint reader/power button key provided by the fingerprint reader/power button 300/800 of the present disclosure.

The method 1300 then proceeds to block 1312 where a power actuator element engages a power actuator engagement element in response to movement of the support member and compression of the spring member. In an embodiment, at block 1312, the movement of the support member 400/900 and the compression of the spring member 500/1000 will allow the power actuator element 306/806 to engage the power actuator engagement element 606*a*/1006, which causes the power actuator element 306/806 to transmit a power actuation signal to a power system in the computing device 200 that causes the power system to provide power to the computing device 200 in order to allow the computing device 200 to power on and initialize such that it is available for use by the user.

Thus, systems and methods have been described that provide a combined fingerprint reader/power button key with a relatively low profile/stack height that allows for a reduction in the thickness of the chassis in which it is utilized. For example, the fingerprint reader/power button system of the present disclosure may include a base member defining a plurality of base leg apertures that extend into the base member from a first surface on the base member. A spring member having a plurality of spring legs may engage the first surface of the base member to provide a spring force that is directed away from the first surface of the base member, with the plurality of spring legs defining respective spring leg apertures that are located adjacent respective base leg apertures. A support member may engage the spring member and include a plurality of support legs that are configured to extend through the spring leg apertures and into the base leg apertures. A power actuator element may be connected to the support member and configured to engage a power actuator engagement element when an actuation force is provided on the support member that overcomes the spring force, and a fingerprint reader may be connected to the support member and configured to read a fingerprint from a finger that engages a fingerprint reader surface on the fingerprint reader. As discussed herein, the components and component configuration of the fingerprint reader/power button system of the present disclosure provide a combined fingerprint reader/power button key with a reduced profile/stack height relative to conventional fingerprint reader/power button keys.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fingerprint reader/power button system, comprising:
a base member including a first surface;
a support member that is located adjacent the first surface of the base member and that is configured to move relative to the base member;
a spring member that engages each of the first surface of the base member and the support member to provide a spring force that is directed away from the first surface of the base member and towards the support member;
a power actuator element that is connected to the support member and that is configured to engage a power actuator engagement element when an actuation force is provided on the support member that overcomes the spring force and moves the support member relative to the base member; and
a fingerprint reader that is connected to the support member.

2. The system of claim 1, wherein the power actuator engagement element is positioned on the first surface of the base member.

3. The system of claim 1, wherein the power actuator engagement element is included on the spring member.

4. The system of claim 1, wherein the base member and the support member include an alignment coupling that maintains alignment of the support member and the base member as the support member moves relative to the base member.

5. The system of claim 4, wherein the spring member includes at least one spring member aperture, and wherein the alignment coupling is located in the at least one spring member aperture.

6. The system of claim 1, wherein the base member includes a second surface that is located opposite the base member from the first surface, and wherein the support member is configured to not extend past second surface of the base member when the power actuator element engages the power actuator engagement element.

7. An Information Handling System (IHS), comprising:
a chassis;
a keyboard that is included on the chassis;
a base member on the chassis that includes a first surface;
a support member that is located adjacent the first surface of the base member and that is configured to move relative to the base member;
a spring member that engages each of the first surface of the base member and the support member to provide a spring force that is directed away from the first surface of the base member and towards the support member;
a power actuator element that is connected to the support member and that is configured to engage a power actuator engagement element when an actuation force is provided on the support member that overcomes the spring force and moves the support member relative to the base member; and
a fingerprint reader that is connected to the support member.

8. The IHS of claim 7, wherein the power actuator engagement element is positioned on the first surface of the base member.

9. The IHS of claim 7, wherein the power actuator engagement element is included on the spring member.

10. The IHS of claim 7, wherein the base member and the support member include an alignment coupling that maintains alignment of the support member and the base member as the support member moves relative to the base member.

11. The IHS of claim 10, wherein the spring member includes at least one spring member aperture, and wherein the alignment coupling is located in the at least one spring member aperture.

12. The IHS of claim 7, wherein the base member includes a second surface that is located opposite the base member from the first surface, and wherein the support member is configured to not extend past second surface of the base member when the power actuator element engages the power actuator engagement element.

13. The IHS of claim 7, further comprising:
a processing system that is included in the chassis and coupled to the fingerprint reader.

14. A method for providing a combined fingerprint reader/power button, comprising:
reading, using a fingerprint reader that is included in a key that is connected to a support member, a fingerprint from a finger that engages a fingerprint reader surface on the fingerprint reader that provides an external surface of the key;
receiving, via the external surface of the key, an actuation force that is transmitted via the key to the support member;
moving, in response to the actuation force, the support member;
compressing, in response to the movement of the support member, a spring member that is located between the support member and a first surface of a base member and engages each of the support member and the first surface of the base member to provide a spring force that is less than the actuation force and that is directed away from the first surface of the base member and towards the support member;
moving, in response to the movement of the support member and the compression of the spring member, the support member relative to the base member; and
engaging, with a power actuator engagement element in response to the movement of the support member and the compression of the spring member, a power actuator element that is connected to the support member.

15. The method of claim 14, wherein the power actuator engagement element is positioned on the first surface of the base member.

16. The method of claim 14, wherein the power actuator engagement element is included on the spring member.

17. The method of claim 14, wherein the base member and the support member include an alignment coupling that maintains alignment of the support member and the base member as the support member moves relative to the base member.

18. The method of claim 17, wherein the spring member includes at least one spring member aperture, and wherein the alignment coupling is located in the at least one spring member aperture.

19. The method of claim 14, wherein the base member includes a second surface that is located opposite the base member from the first surface, and wherein the support member is configured to not extend past second surface of the base member when the power actuator element engages the power actuator engagement element.

20. The method of claim 14, wherein the key is included on a keyboard having a chassis, and wherein the base member is included in the chassis.

* * * * *